United States Patent
Russell et al.

(10) Patent No.: US 10,332,114 B2
(45) Date of Patent: Jun. 25, 2019

(54) METHODS, SYSTEMS AND APPARATUSES FOR SECURE TRANSACTIONS

(71) Applicant: APPLE INC., Cupertino, CA (US)

(72) Inventors: David C. Russell, Portsmouth, VA (US); Bart A. Singer, Williamsburg, VA (US); David M. Petka, Arlington, VA (US); Barry W. Johnson, Charlottesville, VA (US)

(73) Assignee: APPLE INC., Cupertino, CA (US)

( * ) Notice: Subject to any disclaimer, the term of this patent is extended or adjusted under 35 U.S.C. 154(b) by 806 days.

(21) Appl. No.: 14/978,118

(22) Filed: Dec. 22, 2015

(65) Prior Publication Data
US 2016/0110721 A1   Apr. 21, 2016

Related U.S. Application Data

(60) Continuation of application No. 12/187,812, filed on Aug. 7, 2008, now abandoned, which is a division of
(Continued)

(51) Int. Cl.
*G06Q 20/40* (2012.01)
*G06Q 20/00* (2012.01)
(Continued)

(52) U.S. Cl.
CPC ....... *G06Q 20/40145* (2013.01); *G06Q 20/00* (2013.01); *G06Q 20/12* (2013.01);
(Continued)

(58) Field of Classification Search
CPC .. G06Q 20/00; G06Q 20/341; G06Q 20/3821; H04L 63/0861
See application file for complete search history.

(56) References Cited

U.S. PATENT DOCUMENTS

| 4,189,270 A | 2/1980 | Ehrlich |
| 4,408,203 A | 10/1983 | Campbell |

(Continued)

FOREIGN PATENT DOCUMENTS

| DE | 195 35 803 A1 | 3/1997 |
| EP | 0 704 788 A2 | 4/1996 |

(Continued)

OTHER PUBLICATIONS

Avolie, F. M., "Buyer's guide: biometrically speaking", Network Computing, Manhassset, Aug. 23, 1999; vol. 10, Issue 17: pp. 4.
(Continued)

*Primary Examiner* — Nabil H Syed
(74) *Attorney, Agent, or Firm* — Allen, Dyer, Doppelt + Gilchrist, P.A.

(57) ABSTRACT

The invention is directed towards methods, systems and apparatuses, see FIG. 1, (100) for providing secure and private interactions. The invention provides capability for verifying the identity of a party initiating an electronic interaction with another party through data input module (140) which is verified by the identity verification module (150), which further includes a self-destruct mechanism (153). Embodiments of the invention include secure methods for conducting transactions and for limiting the transfer and distribution of personal data to only those data that are absolutely necessary for the completion of the transactions. The invention facilitates the transfer of additional personal data contingent upon an agreement that appropriately compensates the provider of the personal data.

13 Claims, 11 Drawing Sheets

Related U.S. Application Data application No. 10/148,512, filed as application No. PCT/US00/42323 on Nov. 29, 2000, now abandoned.

(60) Provisional application No. 60/168,082, filed on Nov. 30, 1999.

(51) Int. Cl.

| | | |
|---|---|---|
| *G06Q 20/12* | (2012.01) | |
| *G06Q 20/34* | (2012.01) | |
| *G06Q 20/38* | (2012.01) | |
| *G06Q 30/02* | (2012.01) | |
| *G06Q 30/06* | (2012.01) | |
| *G07F 7/10* | (2006.01) | |
| *H04L 29/06* | (2006.01) | |

(52) U.S. Cl.
CPC ......... *G06Q 20/341* (2013.01); *G06Q 20/387* (2013.01); *G06Q 20/3821* (2013.01); *G06Q 20/40* (2013.01); *G06Q 20/4014* (2013.01); *G06Q 30/02* (2013.01); *G06Q 30/0609* (2013.01); *G06Q 30/0633* (2013.01); *G06Q 30/0641* (2013.01); *G07F 7/1008* (2013.01); *H04L 63/0861* (2013.01); *G06Q 2220/00* (2013.01)

(56) References Cited

U.S. PATENT DOCUMENTS

| | | | |
|---|---|---|---|
| 4,582,985 | A | 4/1986 | Loefberg |
| 4,961,142 | A | 10/1990 | Elliott et al. |
| 4,993,068 | A | 2/1991 | Piosenka et al. |
| 5,012,049 | A | 4/1991 | Schier |
| 5,053,608 | A | 10/1991 | Senanayake |
| 5,131,038 | A | 7/1992 | Puhl et al. |
| 5,144,680 | A | 9/1992 | Kobayashi et al. |
| 5,280,527 | A | 1/1994 | Gullman et al. |
| 5,291,560 | A | 3/1994 | Daugman |
| 5,294,782 | A | 3/1994 | Kumar |
| 5,386,104 | A | 1/1995 | Sime |
| 5,457,747 | A | 10/1995 | Drexler et al. |
| 5,469,506 | A | 11/1995 | Berson et al. |
| 5,481,265 | A | 1/1996 | Russell |
| 5,493,621 | A | 2/1996 | Matsumura |
| 5,526,428 | A | 6/1996 | Arnold |
| 5,591,949 | A | 1/1997 | Bernstein |
| 5,613,012 | A | 3/1997 | Hoffman et al. |
| 5,615,277 | A | 3/1997 | Hoffman |
| 5,623,552 | A | 4/1997 | Lane |
| 5,659,626 | A | 8/1997 | Ort et al. |
| 5,719,950 | A | 2/1998 | Osten et al. |
| 5,729,220 | A | 3/1998 | Russell |
| 5,757,278 | A | 5/1998 | Itsumi |
| 5,805,719 | A | 9/1998 | Pare, Jr. et al. |
| 5,838,812 | A | 11/1998 | Pare, Jr. et al. |
| 5,869,822 | A | 2/1999 | Meadows, II et al. |
| 5,870,723 | A | 2/1999 | Pare et al. |
| 5,870,823 | A | 2/1999 | Bezama et al. |
| 5,878,157 | A | 3/1999 | Mukohzaka |
| 5,920,640 | A | 7/1999 | Salatino et al. |
| 5,949,335 | A | 9/1999 | Maynard |
| 5,952,641 | A | 9/1999 | Korshun |
| 5,966,697 | A | 10/1999 | Fergerson et al. |
| 5,991,408 | A | 11/1999 | Pearson et al. |
| 5,995,630 | A | 11/1999 | Borza |
| 6,002,344 | A | 12/1999 | Bandy et al. |
| 6,011,554 | A | 1/2000 | King et al. |
| 6,011,858 | A | 1/2000 | Stock et al. |
| 6,012,039 | A | 1/2000 | Hoffman et al. |
| 6,016,476 | A | 1/2000 | Maes et al. |
| 6,018,739 | A | 1/2000 | McCoy et al. |
| 6,021,212 | A | 2/2000 | Ho |
| 6,031,519 | A | 2/2000 | O'Brien |
| 6,035,280 | A | 3/2000 | Christensen |
| 6,038,666 | A | 3/2000 | Hsu et al. |
| 6,040,783 | A | 3/2000 | Houvener et al. |
| 6,041,410 | A | 3/2000 | Hsu et al. |
| 6,068,184 | A | 5/2000 | Barnett |
| 6,084,967 | A | 7/2000 | Kennedy et al. |
| 6,084,968 | A | 7/2000 | Kennedy et al. |
| 6,102,286 | A | 8/2000 | Hammond |
| 6,111,506 | A | 8/2000 | Yap et al. |
| 6,111,977 | A | 8/2000 | Scott et al. |
| 6,112,189 | A | 8/2000 | Rickard et al. |
| 6,116,505 | A | 9/2000 | Withrow |
| 6,121,544 | A | 9/2000 | Petsinger |
| 6,122,625 | A | 9/2000 | Rosen |
| 6,125,192 | A * | 9/2000 | Bjorn .................. G06F 21/32 340/5.83 |
| 6,150,921 | A | 11/2000 | Werb et al. |
| 6,154,879 | A | 11/2000 | Pare, Jr. et al. |
| 6,157,871 | A | 12/2000 | Terranova |
| 6,167,517 | A | 12/2000 | Gilchrist et al. |
| 6,181,803 | B1 | 1/2001 | Davis |
| 6,182,221 | B1 | 1/2001 | Hsu et al. |
| 6,185,316 | B1 | 2/2001 | Buffam |
| 6,201,484 | B1 | 3/2001 | Russell |
| 6,202,151 | B1 | 3/2001 | Musgrave et al. |
| 6,219,793 | B1 | 4/2001 | Li et al. |
| 6,268,788 | B1 | 7/2001 | Gray |
| 6,269,348 | B1 | 7/2001 | Pare, Jr. et al. |
| 6,282,649 | B1 | 8/2001 | Lambert et al. |
| 6,317,834 | B1 | 11/2001 | Gennaro et al. |
| 6,327,578 | B1 | 12/2001 | Linehan |
| 6,353,889 | B1 | 3/2002 | Hollingshead |
| 6,366,682 | B1 | 4/2002 | Hoffman et al. |
| 6,367,017 | B1 | 4/2002 | Gray |
| 6,466,781 | B1 | 10/2002 | Bromba et al. |
| 6,484,260 | B1 | 11/2002 | Scott et al. |
| 6,487,662 | B1 | 11/2002 | Kharon et al. |
| 6,490,680 | B1 | 12/2002 | Scheidt et al. |
| 6,529,885 | B1 | 3/2003 | Johnson |
| 6,532,298 | B1 | 3/2003 | Cambier et al. |
| 6,581,161 | B1 | 6/2003 | Byford |
| 6,601,037 | B1 | 7/2003 | Kolls |
| 6,608,914 | B1 * | 8/2003 | Yamaguchi ........ G06K 9/00221 235/380 |
| 6,609,198 | B1 | 8/2003 | Wood et al. |
| 6,615,264 | B1 | 9/2003 | Stoltz et al. |
| 6,618,806 | B1 | 9/2003 | Brown et al. |
| 6,636,973 | B1 | 10/2003 | Novoa et al. |
| 6,657,538 | B1 | 12/2003 | Ritter |
| 6,662,166 | B2 | 12/2003 | Pare, Jr. et al. |
| 6,668,322 | B1 | 12/2003 | Wood et al. |
| 6,668,332 | B1 | 12/2003 | McNeil |
| 6,671,808 | B1 | 12/2003 | Abbott et al. |
| 6,681,034 | B1 | 1/2004 | Russo |
| 6,710,700 | B1 * | 3/2004 | Tatsukawa ............ B60R 25/04 340/5.52 |
| 6,719,200 | B1 | 4/2004 | Wiebe |
| 6,728,881 | B1 | 4/2004 | Karamchetty |
| 6,735,695 | B1 | 5/2004 | Gopalakrishnan et al. |
| 6,745,936 | B1 | 6/2004 | Movalli et al. |
| 6,751,734 | B1 | 6/2004 | Uchida |
| 6,757,411 | B2 | 6/2004 | Chau |
| 6,765,470 | B2 | 7/2004 | Shinzaki |
| 6,766,040 | B1 | 7/2004 | Catalano et al. |
| 6,775,776 | B1 | 8/2004 | Vogt et al. |
| 6,786,397 | B2 | 9/2004 | Silverbrook et al. |
| 6,819,219 | B1 | 11/2004 | Bolle et al. |
| 6,832,317 | B1 | 12/2004 | Strongin et al. |
| 6,836,843 | B2 | 12/2004 | Seroussi et al. |
| 6,837,436 | B2 | 1/2005 | Swartz et al. |
| 6,839,688 | B2 | 1/2005 | Drummond et al. |
| 6,844,660 | B2 | 1/2005 | Scott |
| 6,848,052 | B2 | 1/2005 | Hamid et al. |
| 6,850,147 | B2 | 2/2005 | Prokoski et al. |
| 6,850,252 | B1 | 2/2005 | Hoffberg |
| 6,853,739 | B2 | 2/2005 | Kyle |
| 6,857,073 | B2 | 2/2005 | French et al. |
| 6,862,443 | B2 | 3/2005 | Witte |
| 6,870,946 | B1 | 3/2005 | Teng et al. |
| 6,870,966 | B1 | 3/2005 | Silverbrook et al. |

(56) References Cited

U.S. PATENT DOCUMENTS

| | | | |
|---|---|---|---|
| 6,871,193 | B1 | 3/2005 | Campbell et al. |
| 6,871,287 | B1 | 3/2005 | Ellingson |
| 6,871,784 | B2 | 3/2005 | Jayaratne |
| 6,876,757 | B2 | 4/2005 | Yau et al. |
| 6,877,097 | B2 | 4/2005 | Hamid et al. |
| 6,879,243 | B1 | 4/2005 | Booth et al. |
| 6,879,966 | B1 | 4/2005 | Lapsley et al. |
| 6,880,749 | B1 | 4/2005 | Green et al. |
| 6,880,750 | B2 | 4/2005 | Pentel |
| 6,883,709 | B2 | 4/2005 | Joseph |
| 6,886,096 | B2 | 4/2005 | Appenzeller et al. |
| 6,886,101 | B2 | 4/2005 | Glazer et al. |
| 6,886,104 | B1 | 4/2005 | McClurg et al. |
| 6,888,445 | B2 | 5/2005 | Gotfried et al. |
| 6,898,577 | B1 | 5/2005 | Johnson |
| 6,901,154 | B2 | 5/2005 | Dunn |
| 6,901,155 | B2 | 5/2005 | Xia et al. |
| 6,901,266 | B2 | 5/2005 | Henderson |
| 6,901,382 | B1 | 5/2005 | Richards et al. |
| 6,985,502 | B2 | 1/2006 | Bunton |
| 7,003,495 | B1 | 2/2006 | Burger et al. |
| 7,089,208 | B1 | 8/2006 | Levchin et al. |
| 7,234,640 | B2 | 6/2007 | Pentel |
| 7,240,022 | B1 | 7/2007 | Bistriceanu et al. |
| 7,240,025 | B2 | 7/2007 | Stone et al. |
| 8,566,250 | B2 | 10/2013 | Russell et al. |
| 2001/0000535 | A1 | 4/2001 | Lapsley et al. |
| 2001/0011680 | A1 | 8/2001 | Soltesz et al. |
| 2001/0014868 | A1 | 8/2001 | Herz et al. |
| 2001/0029493 | A1 | 10/2001 | Pare et al. |
| 2001/0032115 | A1 | 10/2001 | Goldstein |
| 2002/0035542 | A1 | 3/2002 | Turney et al. |
| 2002/0046118 | A1 | 4/2002 | Minte |
| 2002/0129285 | A1 | 9/2002 | Kuwata et al. |
| 2002/0138768 | A1 | 9/2002 | Murakami et al. |
| 2002/0143567 | A1 | 10/2002 | Maritzen et al. |
| 2003/0054879 | A1 | 3/2003 | Schneier et al. |
| 2003/0097350 | A1 | 5/2003 | Shamrao |
| 2003/0129965 | A1 | 7/2003 | Seigel |
| 2003/0139984 | A1 | 7/2003 | Seigel |
| 2003/0233278 | A1 | 12/2003 | Marshall |
| 2004/0044627 | A1 | 3/2004 | Russell et al. |
| 2004/0064371 | A1 | 4/2004 | Crapo |
| 2004/0064415 | A1 | 4/2004 | Abdallah et al. |
| 2005/0109835 | A1 | 5/2005 | Jacoby et al. |
| 2006/0143101 | A1 | 6/2006 | Johanns et al. |
| 2006/0163344 | A1 | 7/2006 | Nwosu |
| 2007/0145121 | A1 | 6/2007 | Dallal et al. |
| 2007/0260888 | A1 | 11/2007 | Giobbi et al. |
| 2008/0319872 | A1 | 12/2008 | Russell et al. |
| 2008/0319906 | A1 | 12/2008 | Russell et al. |
| 2008/0319907 | A1 | 12/2008 | Russell et al. |
| 2008/0319915 | A1 | 12/2008 | Russell et al. |

FOREIGN PATENT DOCUMENTS

| | | |
|---|---|---|
| EP | 0 779 497 A2 | 6/1997 |
| EP | 0 945 818 A2 | 9/1999 |
| WO | WO 97/05541 A1 | 2/1997 |
| WO | WO 97/45814 A1 | 12/1997 |
| WO | WO 99/08238 A1 | 2/1999 |
| WO | 99/60503 | 11/1999 |
| WO | WO 99/56429 A1 | 11/1999 |

OTHER PUBLICATIONS

Business Editors/High-tech Writers COMDEX Fall 99, "Indentix Delivers and Ultimate Security with Biometrics for the Mobile Computer; Compaq Endorses Technology as a Critical Next Step in Taking Biometrics on the Road", Business Wire, NY, Nov. 16, 1999; pp. 3.

Zalud, B. "Bimoetris shift; Integration, computer access affect uses", Security, Troy, Dec. 1997; vol. 34, Issue 12, pp. 4.

Walker, L. "Cloaking devices designed for wary web shoppers," The Washington Post, Oct. 10, 2000. pp. 5.

Biosec News, BioNetrix launches BioSEC alliance, bioNetrix.com; Nov. 1999; pp. 2.

Levinsohn, A. "Who will control electronic payments," ABA Banking Journal, vol. 90, No. 90; Sep. 1998. p. 40.

Hettinga R. "A market model for digital bearer instrument underwriting," Philodox Financial Tech. Evangelims, May 1998.

Sony, "Fingerprint Identification Unity (FIU-710)", sony.com, Japan 2001; pp. 24.

Gray, D. "Security and convenience at Kroger," E-Payments 2000, Jun. 1999.

Fickensher, L. "Visa shores up web position, ends fees on theft of card numbers," American banker, Feb. 22, 2000.

Kiesnoski. K. "Digital wallets," Bank Systems+Technology, Oct. 1999.

Curley, B. "Paying at the PC," Bank Systems+Technology, Oct. 1999.

Ashbourn. J. "The Biometric Whitepaper," ntlworld.com, 1999.

Schneier, B. "Applied cryptography: Protocols, algorithms an source code in C," Second Edition, 1999; John Wiley & Sons, Inc. pp. 4.

* cited by examiner

METHODS, SYSTEMS AND APPARATUSES FOR SECURE TRANSACTIONS

CROSS-REFERENCE TO RELATED APPLICATIONS

This application claims priority to and is a continuation of U.S. patent application Ser. No. 12/187,812 filed Aug. 7, 2008 which is a divisional of U.S. patent application Ser. No. 10/148,512 filed May 30, 2002, entitled "Methods, Systems and Apparatuses for Secure Transactions," which is a U.S. national-stage application of PCT Application No. PCT/US00/42323, filed on Nov. 29, 2000, entitled "Methods, Systems and Apparatuses For Secure Transactions," which claims priority of U.S. Patent Application No. 60/168,082 filed Nov. 30, 1999, entitled "Apparatus for Controlling Converged Media Systems Including Payment Applications, Using a Privacy and Security-Oriented, Customer-Centered Authentication Architecture for Users of Pointing Identifying Devices and Biometrics Pointing Identifying Devices," each of which is incorporated herein by reference in their entireties.

This application is related to U.S. patent application Ser. No. 12/187,806 filed Aug. 7, 2008 (now U.S. Pat. No. 8,566,250), U.S. patent application Ser. No. 12/187,808 filed Aug. 7, 2008 and U.S. patent application Ser. No. 12/187,817 filed Aug. 7, 2008, and each of which is incorporated herein by reference in their entirety.

FIELD OF THE INVENTION

The present invention relates to methods, systems, and corresponding apparatuses for providing secure interactions.

BACKGROUND

Most existing payment-processing and transactions-processing systems have been designed by vendors, primarily to serve the vendors. Historically, the ability of a customer to use a payment option other than cash had been viewed as a sufficient concession to the customer. Non-cash payment systems put the vendor at risk of not receiving payment, hence vendors and their associated financial institutions felt justified in specifying stringent criteria for customers to use non-cash payment systems. For face-to-face transactions at the point of sale, a vendor would typically require a picture identification and/or a driver's license, together with a signature to accept a check drawn on a local financial institution. For credit card purchases, a signature and sometimes a picture identification would be required. In both these cases, the vendor, and his/her employees also have access to customer account information associated with the check or credit card.

Although most traditional vendors use the data provided to them by their customers only to secure the payment due to them from the transaction, the data collected has additional valuable potential, even if clearly fraudulent activities—such as using the customer's credit-card data to make unauthorized purchases—are not considered. For instance, a vendor could track the frequency, amount, location, type, and other data about purchases for each particular customer. This data could be used to develop targeted advertising strategies designed to get the customer into the store immediately and/or after a prolonged absence. In addition, mailing lists of customers could be developed that could be sold to financial institutions or other vendors who want to promote their credit cards. Until recently, the cost and tedium involved in compiling and processing such data discouraged aggressive use of personal data. However, due to recent technological advances, this has completely changed. Over the past several years, the plummeting cost of computing hardware, and the increasing sophistication of data warehousing and data mining software, in combination with exponential growth in digitally-processed and internet-processed customer purchase transactions, has put the security and privacy of the customer at extreme risk, despite contrary assertions of many vendors.

With the advent and growth of electronic commerce, the accelerating ease of compiling and processing such data has encouraged and emboldened vendors to collect and exploit ever-greater amounts of personal data from their customers. The widespread use of Secure Sockets Layer (SSL) has dramatically improved the security of the personal and financial data as it is sent from the customer to the vendor. Hence, until recently, many customers have been willing to provide the requested data with little thought as to exactly what the vendor will do with the data. Many customers have little notion as to the value of that data. This is especially true for commercial transactions that exploit the Internet. In such transactions data collection can be automated and the information gathered can be used in real time for targeted advertising. Despite strict privacy policies to the contrary, vendor-collected customer data can (and often is) still sold to mailing lists, where these data and information can be used by companies with whom the customer has no desire to do business. Once customer data is public, the customer often has little or no recourse for retaining the privacy of that information.

According to The Forrester Report (April, 1999 published by Forrester Research Inc.) 48% of both U.S. and European Internet retail companies interviewed indicated that they save customer name, address, and account information for use in an express checkout system. Although such systems help to speed customers through checkout, many of the retail companies admitted, "[their] transactions systems have limited scalability, poor fraud detection, high ongoing costs, and lack of real-time authorization."

Although retail companies that maintain these customer databases argue that speedier checkout and even targeted advertising are in the customers' interests, the customer is often not clearly informed of what information is being collected and stored and for what purposes. Removing oneself from a customer database, even when possible, can be a time-consuming process.

Perhaps one of the greatest concerns over the warehousing of customer data and information is the highly lucrative target that such a concentration of personal and financial information presents to hackers and other thieves. According to the Washington Post ("Cloaking Devices Designed for Wary Web Shoppers," The Washington Post, Oct. 19, 2000, page E01), hackers stole 15,600 credit-card numbers from a Western Union web site during the month of September 2000. Credit card fraud represents a huge loss to both the credit-card industry and individual consumers. An estimated 0.06% of point-of-sale credit-card purchases and as much as 1% of online credit-card purchases are fraudulent ("VISA Shores up Web Position, Ends Fees on Theft of Credit Cards," American Banker, February, 2000; "Equity Research Report on First Data Corp.," Morgan Keegan, January, 2000). Other estimates by vendor symposia (e.g., the "Card Tech/Secure Tech" trade show on Dec. 1, 1999) estimate much higher figures, generally estimating that "Card Not Present" transactions experience 6 (six) times greater incidence of fraud than actual physical "Card Present" transactions. Although most individual consumers face limited financial liabilities if unauthorized use of their credit-card information is promptly reported, dealing with instances of fraud can be frustrating and time-consuming. Notwithstanding, in the final analysis, all consumers eventually pay for credit-card fraud in the form of higher vendor prices and less attractive credit-card terms than might otherwise be available.

Numerous alternatives now exist for performing financial transactions over computer networks.

Shawn Abbott ("The Debate for Secure E-Commerce," Performance Computing February 1999) discusses both SSL and Secure Electronic Transactions (SET) protocols for electronic commerce. As stated in the article, "SSL is widely used because it is built into all major Web browsers and servers and is easy to apply." However, beyond verifying that the vendor is a bona fide company and that the customer's computer is dealing with the vendor's server, SSL protocol does little more than facilitate encrypted and reliable interaction between computers. On the other hand, SET is a messaging protocol specifically designed by financial institutions to facilitate bankcard transactions over open networks such as the Internet.

To use SET, the customer has a digital certificate that is stored and encrypted using a pass phrase selected by the customer. A SET electronic wallet can be established by combining: (1) a digital certificate with (2) financial account information, (3) a private encryption key and (4) some additional software. To make a purchase, the vendor's server sends a request to open the customer's SET wallet on the customer's computer. The customer is prompted for the pass phrase to authorize use of the SET wallet. After confirmation of the customer's pass phrase, payment instructions, including the customer's account data are bundled into an encrypted and protected message. The message is bundled in such a way that the vendor cannot secretly access or tamper with it. The message, together with an authorization request by the vendor is forwarded to a payment gateway, which typically is a server at the vendor's financial institution. The messages are then decrypted off the open network and the processing between financial institutions occurs as in standard credit or debit card transactions. In the SET protocol all participants hold digital certificates rooted in a common SET key. Hence all participants are assured that the other participants have been approved to act in their required roles.

The use of the SET protocol is more secure than the straightforward use of SSL. Its more widespread use has been slowed by the requirement that special software is required to be installed by all participants and that customers are required to be issued digital certificates. In addition, nagging worries about security still exist. Although each digital certificate is protected by a pass phrase, if the pass phrase is compromised, unauthorized purchases can be made using the digital certificate. To address this issue, the SET protocol has built-in capability to accept digital certificates from personal tokens, such as smart cards. For smart cards to be used for Internet transactions, many more computers require card-reading capability. Although the use of smart cards lessens the possibility of fraud, stolen smart cards could be used like stolen credit cards to impersonate the original owner.

According to Kenneth Kiesnoski ("Digital Wallets," Bank Systems+Technology, October 1999) both client-based and server-based digital wallets have a number of proponents. The digital wallet is an application that stores financial account information, account-owner names, billing and shipping information, and other information that might typically be required to make an electronic transaction. At the customer's direction, all or part of this set of information is transferred to the vendor at the time of purchase. This saves the customer the trouble of typing all that information and possibly making an error.

In a client-based digital wallet the application program resides on the customer's computer. One difficulty with client-based electronic wallets is their lack of portability. Every time the customer uses a different computer, the information that had been stored in the digital wallet must be reloaded into the same or similar program on the current computer. Another issue is that important personal and financial information resides on the client's computer. Traditionally, personal computers have not been particularly secure machines. Individuals with appropriate computer expertise who have physical access to a particular personal computer can generally extract information from it. Until recently, security breaches of personal computers from the outside were generally limited to viruses and worms embedded in downloads and email messages. Use of cable modems and other devices that facilitate continuous or near-continuous connectivity increases the probability for an increased number of security breaches of personal computers.

A server-based digital wallet resides on a server connected to the Internet. Most server-based digital wallets had been marketed by banks and did not accommodate information from cards issued by competing banks. More recently, the trend has been shifting towards allowing multiple cards backed by different organizations to be included in the digital wallet. Server-based digital wallets provide more flexibility than client-based digital wallets in that they can be accessed from any computer. Presumably, server-based digital wallets are maintained on computers that are more secure than the typical personal computer, however the booty for a successful hacker is multiplied by the number of registrants whose information is stored on that server. In addition, each individual's data is protected only by a simple password, and members of the general public have been notoriously lax in choosing and maintaining passwords.

Hardware developments are also proposed to enable more secure and flexible payments by computers.

Bob Curley ("Paying at the PC," Bank Systems+Technology, October, 1999) discusses two systems designed to interact with personal computers.

The first is the UTM MACHINE, developed by UTM Systems. A user inserts a credit or debit card into the UTM MACHINE and then slides the UTM MACHINE with the inserted card into a floppy disk drive. The machine uses the heads of the floppy disk drive to read the magnetic stripe on the credit or debit card. An Internet browser is then used to access a World Wide Web (WWW) page at the user's bank. The WWW page simulates the action of an automated teller machine (ATM), complete with personal identification number (PIN) authentication. Vendor identification numbers can be entered on the WWW page to transfer funds to a particular vendor.

The second hardware development discussed by Curley is the INTELLIPACK 100, developed by NetPack. The INTELLIPACK 100 is a keyboard with built-in credit card and smart card readers. Like the UTM MACHINE, the transactions occur without transmitting financial account information to the vendor. These hardware developments can make Internet transactions almost as secure as point-of-sale financial transactions.

Additional hardware developments are further improving the security of all credit and debit card transactions.

In "The Biometrics White Paper," Ashbourn discusses a large number of generic issues associated with biometric identification for use in security applications. Ashbourn defines biometrics "as measurable physiological and/or behavioral characteristics that can be utilized to verify the identity of an individual. They include fingerprints, retinal and iris scanning, hand geometry, voice patterns, facial recognition and other techniques." Our use of the term "biometrics" and related forms of the word are intended to be consistent with the above-quoted definition. However, an individual's written signature and/or handwriting are not to be considered biometrics in the context of this application.

The Ashbourn paper also contains reviews of some particular products that are currently or will soon become commercially available.

Precise Biometrics, in cooperation with iD2 Technologies and Miotec Oy is developing technology to enable the use of a fingerprint to enhance the security of Internet transactions. Information on their web site is sketchy, but their proposed scheme apparently uses a smart card and a separate reader that is connected to a personal computer. The smart card would be inserted into the separate reader, which would read the fingerprint data and send the data to the smart card chip. The chip on the smart card would compare the fingerprint with the stored template and if they match, send off an Internet order. The use of a separate reader reduces the flexibility of the approach.

In U.S. Pat. No. 6,011,858 by Stock et al., a programmable memory card is adapted to hold personal information of a user and includes a biometric template of a physical characteristic of the user. The patent also discloses a biometric verification system that includes a biometric scanner configured to generate a biometric template based on a physical characteristic of a user. The biometric scanner is also configured to verify each user's live physical characteristic against the biometric template of the physical characteristic stored on the memory card. A programmable memory card reader is also used. The programmable memory card reader is in communication with the biometric scanner and is configured to receive a memory card and to communicate with the biometric scanner to store the biometric template generated by the biometric scanner to the memory card. The memory card reader is also configured to retrieve the biometric template stored on the memory card and to ensure the security of the information that relates to the applications stored on the card. As with the Precise Biometrics approach, the separation of the biometric scanner from the smart card reduces flexibility of the system.

In U.S. Pat. No. 6,084,968 by Kennedy et al., an apparatus and method are described for providing multiple secure functions in a host or wireless radiotelephone. The determination of the secure function is determined by credential information carried on a smart card or security token. To provide for an authentication function, the smart card may store biometric features of a user. As in the previous patent, the smart card is separate from the device that obtains the live biometric.

In U.S. Pat. No. 6,016,476, Macs et al. describe a portable information and transaction processing system that uses biometric authorization and digital certificate security. The system requires the use of a personal digital assistant (PDA) in which the user stores his or her financial and personal information.

SUMMARY OF THE INVENTION

Selected embodiments of the invention address and resolve various aspects of the abovementioned difficulties as well as other issues that will be set forth in part in the description that follows, and in part will be obvious from the description, or may be learned by the practice of the invention. No particular embodiment is required to solve any one particular problem set forth above or below. Rearrangements of components in ways not explicitly described but which would be obvious to a skilled practitioner of the art are included in the broad scope of the invention.

This invention empowers customers to retain more control over their personal data. Preferred embodiments of the invention provide the vendor with stronger assurances of receiving any non-cash payment, but limit the personal data accessible to the vendor. In various preferred embodiments, personal data provided to the vendor in excess of that required to assure payment are provided in return for some valuable consideration.

For example, a customer may wish to purchase a deliverable, which we define as any property, goods, or services that the customer may receive in return for some valuable consideration (other property, goods, services, or money). The deliverable has a price, typically a monetary value, although the price could be set in terms of other forms of valuable consideration. In this example, some party has an interest in receiving personal data about the customer. In preferred embodiments, this party is either the manufacturer or the vendor of the deliverable, although the precise relationship of this party to the transaction is not important. For instance, the party may be an affiliate of the vendor or manufacturer or may be a company that has a contract with the vendor or manufacturer. The category of personal data desired will be called a personal data field. For instance, a customer name would be a personal data field. The value of that personal data field is the specific customer's name, for example, Jones.

In one preferred and illustrative embodiment of the invention, a party receives from the customer a value for at least one prescribed personal data field. The value of the at least one prescribed personal data field is certified as corresponding to the customer. Finally, the price of the deliverable is reduced by a prescribed discount. The prescribed discount is independent of the value of the prescribed personal data field. The discount depends only on the fact that the customer has provided a value for the prescribed data field. For instance, the discounter may offer a first discount to any customer from whom the discounter receives an age that is certified as belonging to the customer. Regardless of the value of the age, the discounter must provide this first discount. A second discount might, for instance, be available to customers over age 65. The addition of the second discount does not negate the fact that the first was provided without regard to the customer's age.

Other embodiments of the invention involve methods by which a payment may be conveyed from a payer to a payee by means of a financial institution or other financial intermediary. The words "payer" and "payee" are intended to be very general terms to identify the party making the payment (the payer) and the party receiving the payment (the payee). In typical circumstances, the payee is a vendor and the payer is a customer, although the payment method is intended to be inclusive of arrangements that include multiple additional parties.

The term financial intermediary is intended to cover a broad range of entities. The term includes not only traditional financial institutions such as banks, credit unions, savings and loans organizations, credit-card companies, and the like, but also includes private companies, private account vendors, private trusts, private reserves, private depositories, private escrow services, individual persons or any other designated entity, and the like, that can legally maintain accounts and transfer monetary value between accounts. The transfer of monetary value between accounts includes transfers wherein the accounts are maintained in separate financial intermediaries as well as transfers in which the accounts are maintained in the same financial intermediary.

Preferably, the financial intermediary is an entity and/or person(s) bilaterally agreed upon and bilaterally trusted by both the payer and the payee to serve as an escrowing agent, transaction agent, transaction conduit, or other enabling means for moving payments, credits, etc. to the payee account or destination of choice, from the payer account or source of choice.

One embodiment of a method by which a payer conveys a payment to a payee involves receiving payer payment information from the payer. The payer payment information includes at least three pieces of information: the address of the payer's financial intermediary, payer account data that specifies a payer account from which payment is to be made, and a personal identifying device control designation.

The address of the financial intermediary can take any or several of many forms. The address could be a physical address to which physical mail or packages could be sent. The address could also be an address on an open computer network, such as the Internet, or a routing address for a closed computer network, such as the proprietary banking network now in use. In other embodiments, the address of a financial intermediary is a phone or fax number. The address could be the name of the financial intermediary if information as to where to send data could be determined from other sources. In general, the address of the financial intermediary includes any information from which an appropriate destination for sending data could be determined. Because only an address is required, the actual identity or identities of the financial intermediary or intermediaries is neither mandatory, nor necessarily revealed.

The payer account data specifies from what account the payment is to be made. The payer account does not need to be of any special type. For instance, it can be a checking account, a saving account, a money-market account, a credit-card account, or the like, or any other appropriate account. The account data may include a single account or several accounts associated with the payer. References to the payer account are intended to include either a single specified account or a set of accounts. For instance, the payer account data might specify that a certain percentage of the payment be funded from a specified checking account and the balance be funded from a specified credit-card account. This combined payment should be understood as being made from the payer account. In cases using multiple accounts to fund such a transaction, multiple payer financial intermediaries may be called on to participate, thus, multiple payer financial intermediary addresses might be involved. These more complex cases are included within the scope of the invention.

The personal identifying device control designation is an identifying sequence of data given to a personal identifying device (PID). Preferably, the identifying sequence of data is a string of ASCII characters although a pure data stream with no corresponding ASCII equivalent can also be used. In many preferred embodiments, the PID control designation is unique to each PID. However, in some embodiments, the PID control designations are not unique. For instance, a group of PIDs issued to a single company might all have the identical PID control designation. PIDs will be discussed in considerably more detail later.

For the purpose of this method of payment, a PID is a portable device that authenticates that a user of the device is privileged to make a payment from the payer account(s) specified in the payer account data. As used in the context of a PID, the word "portable" means that the size and weight of the PID is such that an individual can conveniently carry the PID on his/her person.

The issue of whether the user is privileged to make a payment from the payer account(s) is internal to the PID. For example, a family PID might authenticate that a child is privileged to use the PID, but is only privileged to request that a payment be charged to some accounts, but not others. This matter of privilege is internal to the PID and does not extend to any requirement that the PID actually confirm with the payer financial intermediary that the person requesting that the payment be charged to a particular account is considered authorized to do so by the financial intermediary. Such additional confirmation by the PID is included in some embodiments of the methods, but not in others. The various methods of confirming that the user of the device is privileged to make a payment from the payer account will be discussed later.

After receiving the payer payment information, some embodiments involve confirming that the PID has been registered in the name of the payer and that the device is privileged to access the payer account. In these embodiments, a payee payment packet is formed that includes the payer account data, payee account data and a payment amount. The payee account data, like the payer account data, may be either a single account or a set of accounts with instructions as to how the payment is to be divided between the accounts. The payee payment packet is sent to the payer financial intermediary address. In some embodiments this step is done directly, that is, the payee payment packet is sent directly to the payer financial intermediary address. In other embodiments, the payee payment packet is sent indirectly to the payer financial intermediary address, possibly forwarded by one or more trusted financial (or non-financial) intermediaries. In principle, any other trusted party might be designated to initially receive the payee payment packet. Eventually, payment will be accepted from the payer financial intermediary or intermediaries in the case of multiple financial intermediaries. Acceptance of payment from the payer financial intermediary includes the case in which the payer financial intermediary deposits funds (or some corresponding value) in the payee account at a payee financial intermediary.

In other embodiments, the PID is not immediately confirmed as being privileged to access the payer account and registered in the name of the payer. In many of these embodiments, the payee payment packet includes the PID control designation and confirmation of the PID privileges can be done anytime thereafter.

Alternative embodiments of the invention eliminate the direct involvement of a financial intermediary by making and funding the payment in the form of a bearer financial instrument or the like. The bearer instrument can assume either a familiar, conventional paper serial-numbered certificate form, an electronic digital certificate-based form, or other custom bearer instrument form.

Yet other alternative embodiments of the invention include multiple different methods for a customer to make a purchase from a vendor. These methods involve customer authentication of his or her identity to a PID. If a PID user is identified by a PID as privileged to use that PID, and if the user is also privileged to request that a proposed payment be charged to the customer account, then the PID transfers the customer account data and the customer financial intermediary address to an information processor. In turn, the vendor transfers vendor account data and the payment amount to the information processor. The information processor is a component that receives signals from both the customer (payer) and the vendor (payee). A vendor payment packet is formed that includes the customer account data, the vendor account data, and the payment amount. The vendor payment packet is sent to the customer financial intermediary address. As with the payee payment packet of earlier embodiments, the vendor payment packet may be sent to the appropriate financial intermediary address either directly or indirectly. The customer account is debited by the payment amount plus a customer surcharge and the vendor account is credited by the payment amount minus a vendor surcharge. Either or both the customer surcharge and the vendor surcharge may range from zero to any amount, depending on the embodiment and/or on the surrounding transactional situation and environment.

Additional embodiments of the invention include generic methods for a customer to conduct a transaction. Some of these embodiments comprise the steps of: authenticating the customer identity to a PID, sending customer account data to a receiver, and receiving acknowledgment that the transaction was approved. The receiver can be any device capable of receiving customer data from a PID.

Other embodiments of the invention include methods of interacting with a "simulated inventory". A simulated inventory is defined for the purposes of this application and according to this invention, as a visual representation of a catalog, index, directory, or other content. The contents of the simulated inventory are not limited in this invention.

The visual representation includes all kinds of visual representations, including two-dimensional displays or projection images, three-dimensional displays or projection representations using perspective for the third dimension, and holographic representations. In most embodiments, the visual representation involves a pictographic graphical user interface in which the user virtually travels, or equivalently perambulates, through the simulated inventory by manipulating a cursor. In this application, the term "cursor" includes all displayed control indicia. Typically a cursor is represented by an arrowhead although other representations are used. In some embodiments the cursor is represented by an "avatar" (an icon or representation of a user in a sharable virtual reality environment). Using the cursor, (or in some embodiments, the avatar), the customer can travel about the domain of the simulated inventory, browse the inventory, command any inventory item to detail its properties (sizes, price, etc.), fill a shopping basket or other purchase enabler, and at end-of-shopping-session, pay for the selected item(s).

In one preferred embodiment of a simulated inventory using such a graphical user interface, a multiplicity of such icons are used to represent elements in the inventory. The phrase "graphical user interface" is to be interpreted broadly in this application. The phrase "holographic graphical user interface" will be understood to be a subset of graphical user interfaces and will be used in embodiments in which holographic representations are used similar to two-dimensional graphical user interfaces. All these methods for a user to interact with a simulated inventory include the step of authenticating a user to a PID. The authenticated user provides inputs to the PID allowing the user to travel at any speed they choose through the simulated inventory.

Embodiments of the invention also include systems by which a payer conveys a payment to a payee. Some embodiments of such systems include a PID that transmits signals to an information processor. These signals include the payer account data and the payer financial intermediary address. The information processor receives signals from both the PID and from the payee. The signals from the payee include the payee account data and the payment amount. The information processor then forms a payee payment packet that includes the payer account data, the payee account data, and the payment amount, and sends the payee payment packet to the payer financial intermediary address. The payee payment packet can be sent to the payer financial intermediary address either directly or indirectly, that is, the payee payment packet might be forwarded to one or more intermediaries before arriving at the payer financial intermediary address.

Other embodiments of the invention include verification systems. Embodiments of verification systems comprise: (1) an "actuator" for performing a user-initiated action, (2) a PID that transmits signals that encode an identification and an instruction that one or more user-initiated actions be taken, and (3) a verification processor that receives the signals from the PID and verifies that the identification is associated with a PID that is authorized to request that the one or more user-initiated actions be taken.

After verification, the verification processor signals the actuator to perform the user-initiated action. In preferred embodiments, the identification is the PID control designation, but the term "identification" is intended to be interpreted broadly. The term "actuator" should also be interpreted broadly. The actuators envisioned include those that result in mechanical actions and/or electrical actions, as well as those that result in actions that only involve transfer or manipulation of data.

Still other system embodiments of the invention include simulated inventory systems. Simulated inventory systems include: (1) a "simulated inventory display", (2) a simulated inventory controller that controls the interaction of at least one cursor interacting with at least one icon on the simulated inventory display, and (3) a PID that transmits instructions to the simulated inventory controller.

As illustrated above, numerous embodiments of the present invention include the use of a PID. A PID, generally, is a portable device that authenticates that any user of the device is privileged to use the device, plus, is authorized to request that particular actions be taken. The particular actions to be taken can vary with individual embodiments, but typical actions include, but are not limited to:

initiating a purchase or payment, either over an electronic network or at a vendor-operated sales site (including conventional stores, mobile vendors, service providers, flea markets, etc.);

interacting with a graphical user interface, which may include actuating displayed icons on a screen or monitor;

permitting entry into buildings, homes, automobiles, and other locations that need protected entry capabilities;

making a telephone call, including, but not limited to a voice call, a data call, an electronic mail call, an Internet Service Provider call, an Internet URL portal call, or other URL access call;

logging onto a computer;

initiating a session at an information kiosk; and selecting restricted entertainment options (such as pay-per-view television or television programs that may contain material that would be inappropriate for certain members of a household).

Preferred PID embodiments comprise: a transmitter for sending signals, a user input module for receiving input from a user, a personal data storage medium, an identity verification module, and at least one processor. The processor, or multiple processors, depending upon the details of the design, couple the various components and in some embodiments perform some of the functions assigned to the other components. For instance, the identity verification module includes a verification input component, an identity data module for storing at least one set of stored identity data, and a comparator that compares the user identity data with stored identity data. One or more of the processors may perform the function of the comparator.

Many preferred embodiments of PIDs authenticate a user through the use of a biometric. This type of embodiment is referred to as a "biometric personal identifying device" (BPID). In a BPID, the stored identity data would be considered a biometric template and the verification input component would collect a live biometric sample, which will typically be referred to as a biometric sample. As discussed by Ashbourn, we will use the phrase "biometric template" and variations thereof to refer to a reference sample of a chosen biometric against which a future Live biometric sample is compared. Preferably, neither the biometric template nor the biometric sample is available outside the BPID. Keeping these data local to the BPID reduces the chance that an individual's biometric becomes accessible to the public.

In this application, the acronyms PID (personal identifying device) and BPID (biometric personal identifying device) are used extensively. In a prior provisional application (Ser. No. 60/168,082, filed Nov. 30, 1999), entitled, "Apparatus for Controlling Converged Media Systems Including Payment Applications, Using a Privacy and Security-Oriented, Customer-Centered Authentication Architecture for Users of Pointing identifying Devices and Biometrics Pointing Identifying Devices," which is incorporated by reference herein in its entirety, these same acronyms refer to "Pointing Identifying Device" and "Biometric Pointing Identifying Device." The PID and/or BPID discussed herein, are generalizations and extensions of the specific embodiments of Pointing Identifying Devices and Biometric Pointing Identifying Devices discussed in the provisional application. In particular, as will be further discussed herein, the "pointing" capability of the original Pointing Identifying Device and Biometric Pointing Identifying Device need not be present in all embodiments of PIDs and/or BPIDs. Even in the provisional application, the pointing capability of the devices was not required for all embodiments of the invention. The devices called PIDs and BPIDs in the provisional application should be interpreted as specific embodiments of the more general PIDs and BPIDs discussed herein.

Various embodiments of the invention also include an information processor. Embodiments of an information processor comprise: (1) at least one processor, (2) a receiver for receiving customer data from a PID, (3) a vendor connection that enables the transmission of vendor account data to the information processor, and (4) a financial intermediary connection(s) that facilitates the transmission of vendor account data and customer account data to a financial intermediary. Preferred embodiments of information processors will be discussed later.

BRIEF DESCRIPTION OF THE DRAWINGS

The accompanying drawings illustrate complete embodiments of the invention in which.

Figure 1:
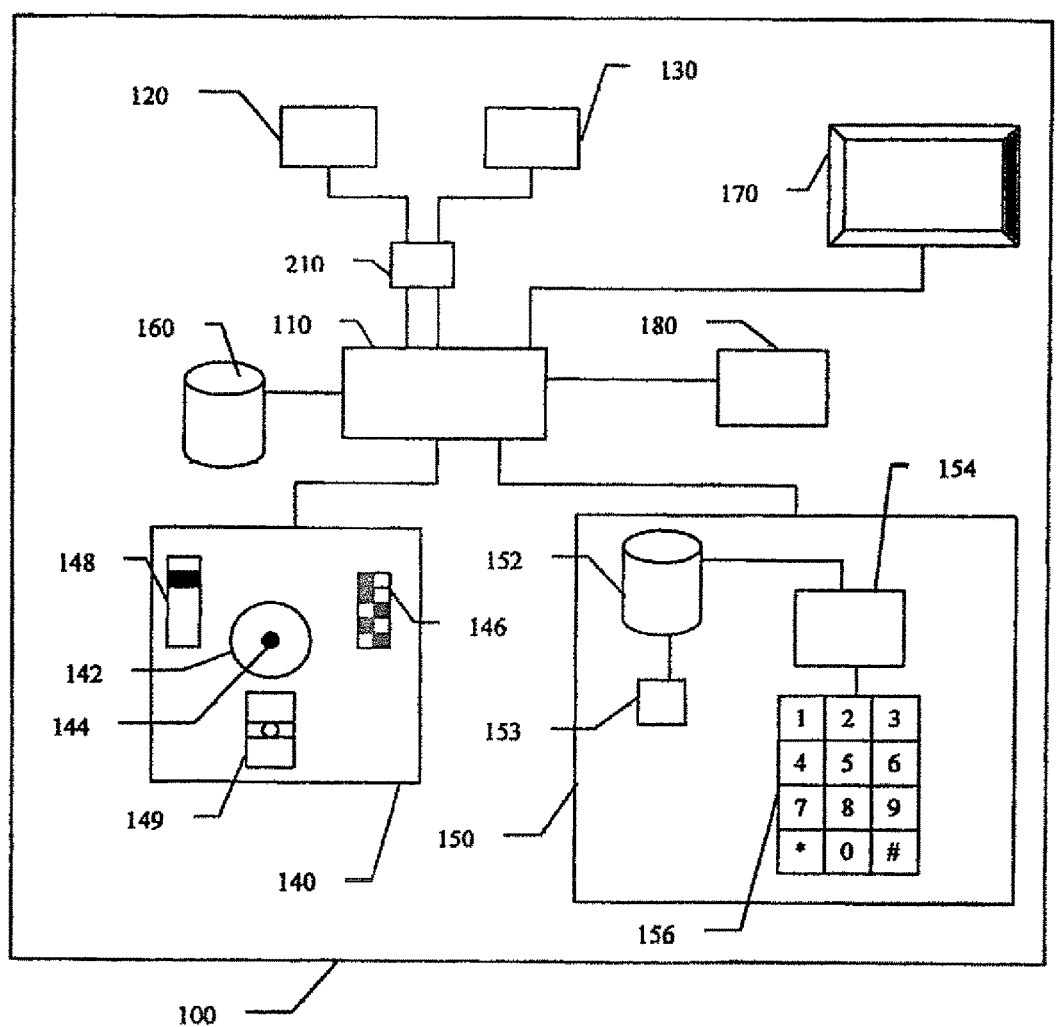
FIG. 1 shows a schematic of an embodiment of a PID.

Reference numerals used in the drawings refer to the corresponding components listed below unless otherwise specified.
100 personal identifying device (PID)
110 processor
120 transmitter
125 transceiver
130 receiver
140 user input module
142 joy stick
144 activation button
146 mode switch
148 slide bar
149 positional sensor
150 identity verification module
152 identity data module
153 self-destruct element
154 comparator
156 keypad
160 data storage medium
170 display device
180 power source
190 biometric input device
200 biometric personal identifying device (BPID)
210 kill switch
220 bar-code reader
230 magnetic-stripe reader
300 information processor
310 processor of the information processor
320 information transmitter
330 information receiver
340 vendor connection
350 financial intermediary connection
360 certification repository connection
400 verification processor
410 processor of the verification processor
420 verification processor transmitter
430 verification processor receiver
460 certification repository connection
470 actuator connection
500 verification system
510 actuator
600 financial intermediary component
610 payee
620 certification repository database
650 simulated inventory system 660 simulated inventory controller
670 simulated inventory display
710 steps in determining prescribed discount and prescribed personal data fields
712 step of specifying customer benefit function
714 step of specifying customer non-negotiable constraints
716 step of specifying customer benefit function normalization value
720 step of maximizing a function subject to constraints
722 step of specifying discounter benefit function
724 step of specifying discounter non-negotiable constraints
726 step of specifying discounter benefit function normalization value
730 step of receiving values for prescribed personal data fields
740 step of certifying that the value of a personal data field corresponds to the customer
750 step of reducing the price by the prescribed discount
810 step of receiving payer payment information
820 step of confirming the PID control designation
830 step of forming a payee payment packet
835 step of sending the payee payment packet to payee financial intermediary
840 step of sending the payee payment packet to payer financial intermediary
850 step of accepting payment
910 step of receiving a payee payment packet
920 step of debiting the payer account
1010 step of selecting items for purchase
1020 step of adding selected items to electronic shopping cart
1030 step of determining the payment amount
1040 step of authenticating the customer identity to a PID
1050 step of transferring data from the PID to the information processor
1060 step of transferring data from the vendor to the information processor
1070 step of forming a vendor payment packet
1080 step of sending the vendor payment packet to the vendor financial intermediary
1090 step of sending the vendor payment packet to the customer financial intermediary
1100 step of debiting the customer account
1110 step of crediting the vendor account
1210 step of selecting items for purchase
1220 step of adding selected items to electronic shopping cart
1230 step of determining the payment amount
1240 step of authenticating the customer identity to a PID
1250 step of sending customer data to a receiver
1260 step of receiving acknowledgement that the transaction was approved
1310 step of selecting items for purchase
1320 step of adding selected items to electronic shopping cart
1330 step of determining the payment amount
1340 step of authenticating the customer identity to a PID
1345 step of certifying payment capability
1350 step of traveling through the simulated inventory

DETAILED DESCRIPTION

Having summarized the broad nature of the invention above, this section will focus on detailed descriptions of various preferred embodiments. Unless specifically stated otherwise, the vocabulary defined previously is intended to apply herein.

Referring now to the drawings, FIG. 1 shows a schematic of a preferred embodiment of a PID 100, which is shown enclosed by the outer boundary. Preferably, the elements indicated in FIG. 1 are integrated in a single unit, preferably supported by an external housing. The PID 100 comprises a processor 110 that processes signals from the various components and controls the operation of the PID 100. One or more processors 110 may be used, depending upon the details of the device. In various embodiments, the processor 110 processes the signals according to one or more algorithms that are loaded as software, firmware, or are hard-wired into the processor 110. Although an electronic microprocessor is the preferred processor 110, all types of processors that can process signals are included within the meaning of the term processor. For instance, fluidic and optical controllers, properly configured, can operate as one or more processors in various embodiments.

The preferred PID 100 also includes a transmitter 120 for transmitting signals and a receiver 130 for receiving signals. The receiver 130 is not included in some PID embodiments, although most preferred embodiments include the receiver 130. In some preferred embodiments, the transmitter 120 and the receiver 130 are combined into a transceiver in which at least some components of the transmitter 120 and the receiver 130 are used in both the transmitter 120 and the receiver 130. Such embodiments should be considered as having both a transmitter 120 and a receiver 130 even though some or all of the components are shared. Transceivers are most likely to be used with radio-frequency transmitters and receivers. The particular types of transmitter 120 and receiver 130 are not critical to the PID 100. Embodiments employing radio-frequency (RF), infrared (IR), microwave, optical, or ultrasonic transmitters and receivers are likely to be most commonly used. Although wireless transmission and reception are preferred, transmitters and receivers that communicate via wires or waveguides are included in the meaning of transmitters and receivers.

In many embodiments both wired and wireless transmitters and receivers are provided. For instance, when used in conjunction with a computer, the PID 100 might be connected to the computer through an RJ-11 phone jack in the PID 100 and the computer's phone jack. Alternatively, a Universal Serial Bus (USB), serial port, or parallel port connection may be used to provide a wired connection to the computer. The wired alternatives might be particularly useful in electronically noisy environments. Preferably, signals received by the receiver 130 and signals transmitted by the transmitter 120 are encrypted. Preferably, an asymmetric encryption scheme, such as a public key/private key scheme is used. In particular, the RSA algorithm (which is described in detail in Schneier, B. C., Applied Cryptography—Protocols, Algorithms, and Source Code in C, Second Edition, John Wiley and Sons, Inc., New York, N.Y., 1996, which is incorporated herein by reference) is one preferred approach for encrypting information transmitted and received by the PID 100. However, other encryption schemes may be used in alternative embodiments.

A user-input module 140 includes at least one input mechanism that enables a user to indicate what action is to be taken. In the preferred embodiment illustrated in FIG. 1, the user-input module 140 includes a joystick 142, an activation button 144, various mode switches 146, a slide bar 148, and a positional sensor 149. Preferably the joystick 142 is sized to be operable by a thumb of the user. The activation button 144 preferably is used to indicate that an action should be taken. The activation button 144 is preferably mounted on the joystick 142 and is used in conjunction with a graphical user interface (GUI) much like a button on an electronic mouse is used. The mode switches 146 are one or more switches that alter the meaning of the user's input according to the setting of the switch. Extensive examples of the use of mode switches are provided in U.S. Pat. No. 5,481,265, which is included in its entirety by reference herein. Slide bar 148 allows for a user input that is proportional to the distance of the bar from one end of its range. Such an input device can be implemented as a variable resistor or a variable capacitor. Alternatively, slide bar 148 can include multiple discrete settings, each of which represent a different control level or control selection (such as high/medium/low/off). Positional sensor 149 (which can be implemented as a tilt sensor, a mobile global positioning system (GPS) unit or any other technology for determining orientation of the device) provides information as to the spatial orientation of the PID. The positional sensor 149 is implemented in any fashion known to those skilled in the art that is appropriate for a particular implementation. The user-input module 140 shown in FIG. 1 is just one example of many possible configurations by which the user can enter information into the PID 100.

Other embodiments may include additional input mechanisms, such as a keypad, a pressure-sensitive surface, a scroll wheel, a bar-code reader, a radio-frequency-tag reader, accelerometers to provide direction of movement and acceleration information of the device, or a magnetic-stripe reader, either individually, or in combination with one or more of the input mechanisms described above. Any or all of these may be integral to the PID 100. In summary, user-input module 140 requires: (1) at least one input mechanism; (2) may include (but is not limited to) multiple of the aforementioned input mechanisms; and (3) may include any other connectable, feasible input mechanism, including some not mentioned herein.

A personal data storage medium 160 stores personal data, and optionally, other data. The personal data storage medium 160 is preferably an easily re-writable medium, such as a magnetic or optical disk or tape. Other non-volatile memory devices such as a Programmable Read Only Memory (PROM), (which can only be written once), an Erasable PROM (EPROM), or an Electronically Erasable PROM (EEPROM) are also suitable. In some implementations, (as with the PROM), the personal data storage medium 160 is not re-writable and must be physically replaced when personal data that is stored on the personal data storage medium 160 changes.

An important part of the PID 100 is an identity verification module 150. The identity verification module 150 comprises an identity data module 152 for storing at least one set of stored identity data, a verification input component (shown in FIG. 1 as a keypad 156), and a comparator 154 that compares the user identity data obtained by the verification input component with at least one set of stored identity data and signals a processor 110 as to whether the inputted user identity data sufficiently match at least one set of stored identity data. In operation, in the embodiment illustrated in FIG. 1, the user identity data can be conveyed by a series of keystrokes entered on the keypad 156. The comparator 154 would determine if the inputted series of keystrokes match a series of stored keystrokes corresponding to a particular authorized user. Whether a match is found, or not, would be communicated to the processor 110.

In some embodiments, the comparison is performed by processor 110. In such embodiments, both the comparator 154 and the processor 110 are both to be considered present, in spite of both elements being embodied in the same physical component.

If the comparator 154 determines that a match exists, the processor 110 would allow the user to initiate or continue taking actions that are determined by the user inputs received from the user input module 140, possibly in combination with signals received from the receiver 130. Such actions would be communicated to the transmitter 120 for transmittal to some other device.

If a match is not found, the processor 110 can initiate an appropriate recovery tactic, exception condition tactic, or course of action based on software, firmware, or hardware alarm routines associated with the pre-determined operational policies, enabled and executed by processor 110. For instance, the processor 110 can be used to print a message on a display device 170, requesting that the user try again, or alternatively, a kill switch 210 could be activated, which (if implemented) could be used to cut off communication of the device, either by means of disabling the transmitter 120 and/or the receiver 130. Alternatively, a beeper (not shown) or a voice message (not shown) could alert the user of his/her error. Although the kill switch 210 is preferably located so as to interrupt data flow to and from the transmitter 120 and the receiver 130, other embodiments locate the kill switch 210 in alternative or additional locations, such as between the processor 110 and the user input module 140.

Further applications of a kill switch 210 and various types of security systems that might be included in various embodiments of a PID 100 are described in U.S. Pat. Nos. 5,481,265 and 5,729,220, both to Russell, both which are included herein by reference in their entireties. In general, a kill switch 210 is a mechanism for immediately revoking security privileges that had been granted and terminating an interactive session between a PID 100 and a device exchanging signals with the PID 100. The kill switch 210 is not required to be part of a PID 100.

Although a display device 170 is not required, it is preferably included as part of a PID 100. When a display device 170 is included, preferably it is a liquid crystal display, although other types of display devices are used in some embodiments.

Preferably, the PID 100 carries its own power source 180, which most preferably includes one or more electrical batteries. Alternatively or additionally, for very low power applications, a bank of capacitors could be used. Alternatively or additionally, power can be fed to the PID 100 via cables, or in some embodiments is wirelessly beamed to the PID 100 from some other device.

Preferably, the PID 100 is portable, meaning that the size and weight of the PID 100 is such that an individual can conveniently carry the PID 100 on his/her person. For example, a PID 100 preferably is sized so that when it is not in use, it can be conveniently carried using at least one of the following: a handbag, a book bag, a belt strap, a pocket, or a wrist strap. Preferably the PID 100 weighs less than two ounces (about 57 grams). Most preferably, the PID 100 weighs less than one ounce (about 28 grams). Preferably the volume is the PID 100 is less than two cubic inches (about 32 cubic centimeters). Most preferably the volume of the PID 100 is less than one cubic inch (about 16 cubic centimeters).

Because of the sensitivity of the user identity data stored on the identity data module 152, preferably the identity data module 152 can be coupled to a self-destruct element 153 that destroys the identity data if unauthorized access to the stored identity data is attempted. For instance, the PID 100 can be built so as to render the identity data unreadable if identity data module 152 is probed by anyone but a qualified technician who follows a pre-determined sequence of actions. Additionally or alternatively, in some preferred embodiments, protective packaging tactics can be used to protect some or all of identity verification module's 150 components. One typically used delicate electronics protection tactic is known as "conformal coating". In this approach, an extremely thin polymer or rubber-like "shrink wrap" is completely superimposed over the electronic components to be protected. Attempts by any unauthorized party to gain physical access to the conformal coating-protected electronics will usually result in the destruction of the coating-protected electronics. In some embodiments, the identity data module 152 is combined with the personal data storage medium 160. In such embodiments, both elements are considered to be present, in spite of the fact that they share a single physical device.

Figure 2A:
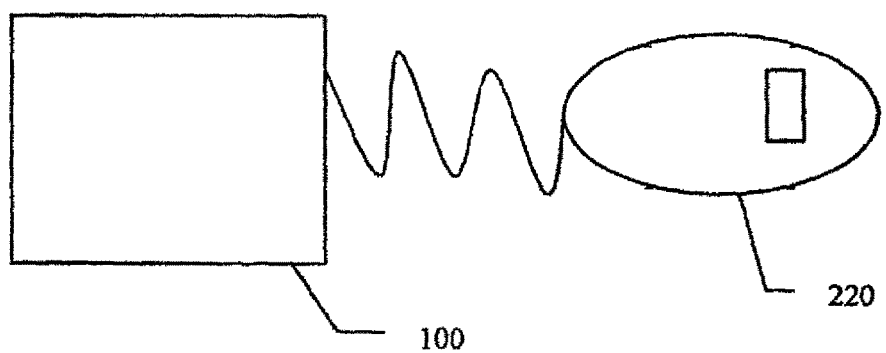
FIG. 2A illustrates a barcode reader coupled to a PID.
Figure 2B:
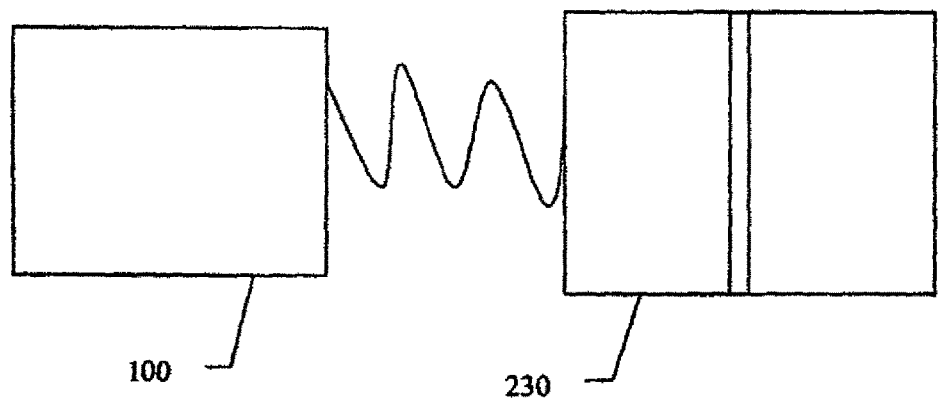
FIG. 2B illustrates a magnetic stripe reader coupled to a PID.

Alternative embodiments include auxiliary input mechanisms. FIG. 2A shows a bar-code reader 220 and FIG. 2B shows a magnetic-stripe reader 230. In both these embodiments, the auxiliary input mechanisms are attached via a cable to the PID 100, although they may communicate with the PID 100 through a wireless system. In some preferred embodiments, such auxiliary input devices are implemented with microminiaturized components that simply plug into the PID 100.

Additional auxiliary input mechanisms, such as radio frequency (RF) tag readers can also be incorporated. RF tag readers can include technology that reads RF tags and/or RF signatures. RF tags emit a bit stream when interrogated while RF signatures reflect a unique RF signature when radiated with RF energy.

In some advanced versions of the PID 100, optional embodiments include the capacity to provide other data and signal outputs beyond the abovementioned outputs of transmitter 120. Such embodiments can provide additional functions, e.g., bar-code writer and magnetic-stripe writer outputs, targeted for use with auxiliary output destination mechanisms such as "PID-readable/writable" smart shelf labels or smart product labels" (in conjunction with PID-initiated bar-code reader/writer functions) (not shown) and/or PID-readable/writable" magnetic cards (in conjunction with PID-initiated magnetic-stripe reader/writer functions) or other optional PID-initiated output target destination devices (not shown).

Some preferred embodiments of PIDs 100 permit integration of the PID with personal data assistants (commonly called PDAs), cellular telephones, or other mobile electronic devices. Preferably this is implemented by providing different adapters that permit coupling of PID 100 with corresponding different mobile electronic devices. Such arrangements would be especially beneficial in cases in which security-sensitive actions are to be performed using such mobile electronic devices. The benefit of coupling any such mobile electronic device with a PID 100, is providing additional assurances that the user of that mobile electronic device has provided the proper user identity data to the PID 100.

Preferred embodiments of PID 100 employ at least one biometric as the user identity data. In these embodiments, a biometric input component must be used as part of the verification input component, either instead of—or in addition to—the keypad 156 of FIG. 1. The biometric input component can vary widely, depending upon the biometric used. Example biometrics that might be used include: digit-prints (thumb- or finger-prints), voice data, retinal data, iris data, and DNA data. Preferably, the biometric is a digit-print—and therefore—the biometric input component is a component that can determine a user's digit-print. Various technologies are available for determining a user's digit-print. For instance, an optical scanner can be used to optically determine the digit-print. More preferably, a capacitive sensor is used. Capacitive digit sensors and their associated circuitry and software are available commercially, for instance the FPS 110 Sensor sold by Veridicom, the FINGERTIP Sensor, sold by Infineon, and the FINGER-LOC AF-S1, sold by Authentec Inc.

Figure 3:
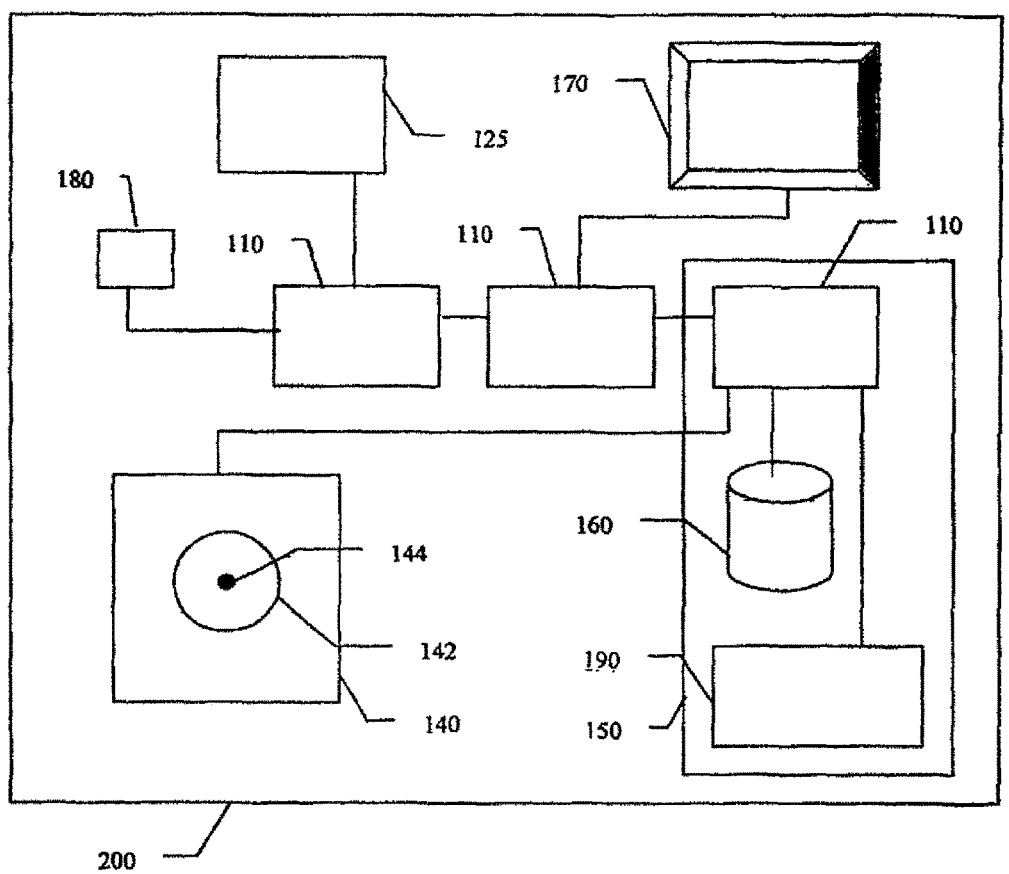
FIG. 3 shows a schematic of an embodiment of a BPID.

An example embodiment of a PID that uses a biometric as the user identity data is shown in FIG. 3 as a BPID 200. Although the biometric input component 190 could simply replace the keypad 156, FIG. 3 illustrates some optional variations in the way the elements are arranged. For instance, in FIG. 3, a transceiver 125 is incorporated to both receive and transmit signals to external devices. Rather than a single processor 110 as in FIG. 1, multiple processors 110 are included in FIG. 3. In particular, the arrangement indicated in FIG. 3 includes a processor 110 on the left that controls the flow of data to and from the transceiver 125. The processor 110 in the middle controls the flow of data to the display 170. The processor 110 on the right controls the flow of data to and from all user input devices, including the user input module 140 (which here includes only a joystick 144 with an activation button 142) and the identity verification module 150. In fact, the processor 110 on the right doubles as the comparator 154 (shown explicitly in FIG. 1) of the identity verification module 150. Similarly, the data storage medium 160 doubles as both the identity data module 152 (shown explicitly in FIG. 1 and which stores the biometric templates when one or more biometrics are used) and the repository for the personal data and possibly for other data as well. Other embodiments include various rearrangements and combinations of the elements of the PID and BPID into ways most suitable for the intended uses of the devices.

Preferably in a BPID, security provisions are taken to ensure that only a trusted party updates the biometric templates and their associated verified data. Typically this party is a verification authority, the details of which will be discussed later herein. However, in some embodiments, the biometric data are updateable without the verification authority. For example, in some embodiments, a particular biometric template is updated by the current biometric sample at either regular or irregular intervals. This procedure allows the current biometric template to more accurately represent any minor changes in the biometric that occur over time, e.g., as the individual ages. Updates that occur after a specified number of accesses, wherein the specified number of accesses are chosen by the BPID itself in its software package and varies depending upon an algorithm in the BPID, inhibit someone from trying to alter the template by repeatedly making very small changes to the biometric. Not knowing when the biometric template updates itself complicates any inappropriate alterations. In alternate embodiments, updates occur at irregular intervals of time, (rather than accesses); thereby further thwarting any attempts to inappropriately change the biometric template. However, embodiments of the invention also include those in which the biometric template is updated regularly and also embodiments in which the biometric template is updated on command of the user. The level of confidence in the data associated with the biometric template would likely be related to the manner in which the biometric template were updateable.

Similarly, the error rate for false positives (accepting as a match samples from two different people) and false negatives (refusing to acknowledge as a match samples from the same person) in the determination of whether the biometric sample sufficiently matches the biometric template is preferably set during manufacturing or registration of the BPID. However, some embodiments allow for user adjustments of the error rates. Preferably such adjustments are only allowed within a range that provides acceptable confidence that the biometric sample is the same as the person who provided the biometric template. Preferred ranges for false positives are 1 in 1,000,000 or 1 in 100,000. For some less secure applications, estimated reasonable ranges for false positives range from 1 in 10,000 to 1 in 1000. False positives that occur more frequently than 1 in 1000 are unlikely to be acceptable for most applications, although even higher rates of false positives might be acceptable in some very low-security embodiments. On the other hand, false negatives are largely an inconvenience. A low frequency of false negatives is desirable, but not required for most embodiments.

Figure 4:
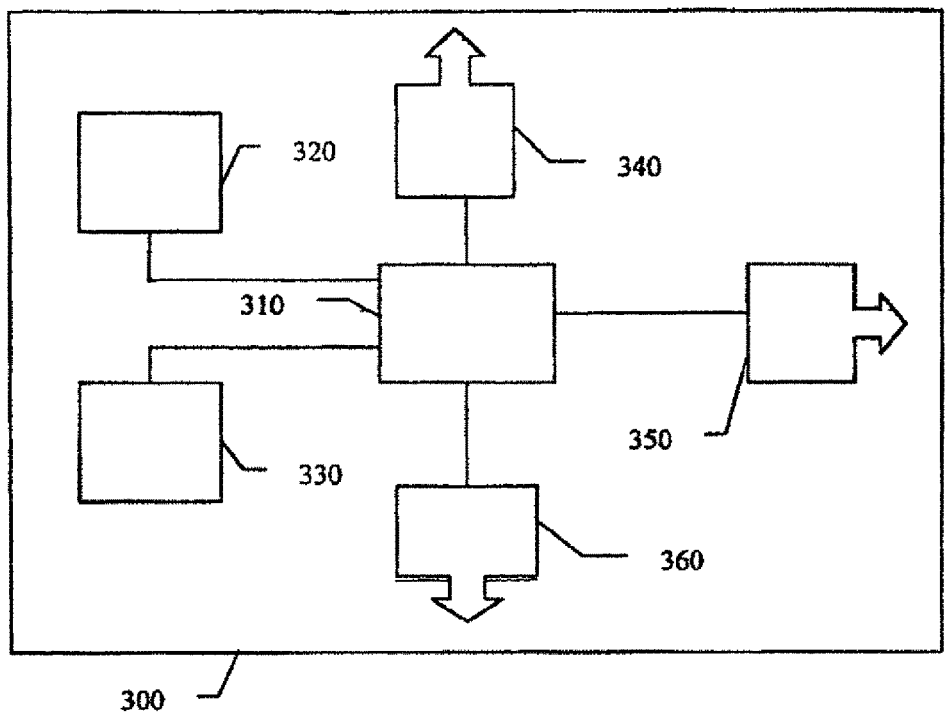
FIG. 4 shows a schematic of an embodiment of an information processor.

To maximize its usefulness, a general PID (including a BPID) interacts with other devices. One such device is known as an information processor and is shown schematically in FIG. 4. The information processor 300 includes: at least one processor 310, an information receiver 330 for receiving information from a PID, a vendor connection 340, and a financial intermediary connection 350. The processor 310 can be part of a general-purpose computer that performs other functions as well as being part of the information processor 300. Preferably, the information processor 300 also includes an information transmitter 320 for transmitting information to a PID. Most preferably, the information transmitter 320 and the information receiver 330 are combined into an information transceiver (not shown).

Preferably, the information processor 300 serves as a bilaterally trusted intermediary between parties, most often, between a payer and a vendor. In some cases it serves as a "unit transaction processor" for a single transaction only, while in other cases it serves as an "ongoing transactions processor" for multiple transactions for that payer/vendor combination. In some embodiments it serves as a "privacy processor" that receives pre-agreed payment transaction information from both the payer and the payee, and transfers only pre-agreed types of information to other parties.

Although not necessary, preferred embodiments of the information processor also include a certification repository connection 360. The vendor connection 340, the financial intermediary connection 350, and the certification repository connection 360 are all preferably coupled to at least one processor 310 of the information processor 300. Preferably, the information processor 300 communicates wirelessly with the PID. Wireless or wired connections to the vendor and the financial intermediary are both permitted.

In its most preferred form, the information processor 300 includes wireless communication with a PID through either an information transmitter 320 and an information receiver 330 or an information transceiver (not shown). The most preferred embodiment also includes a certification repository connection 360. In this most preferred embodiment, the information processor 300 is an embodiment of a wireless verification processor (WVP) and it operates as follows.

In its most preferred embodiments the WVP is a front-end to an existing payment system. The most preferred WVP contains the necessary software/hardware functionality to: (1) communicate with one or more PIDs using a virtual wireless network, (2) obtain and verify the PID data stream with a public key located in a certification repository database, (3) interact with at least one financial intermediary to verify account data, and (4) interface with one or more additional verification sources, networks, databases, as well as other WVP facilities or similar products. A vendor connection is also required so that product price and vendor account information is properly processed.

The WVP exchanges data wirelessly with a PID. Preferably, the two-way communication employs either infrared or radio frequency transmissions. Preferably, the transmitters and receivers in the WVP and the PID will be designed with protocols (for example, Bluetooth) that correct possible data collisions and provide reliable transmissions. In some embodiments, the WVP communicates with only one PID (i.e. when a PID establishes a connection, the WVP will ignore other signals and requests until that particular connection and its associated transaction(s) is completed). In other embodiments, the WVP communicates with multiple PIDs.

In yet another series of embodiments PIDs interface with WVPs by means of very short-range antenna footprint outputs from the PID. This approach reduces the number of PID signals that are likely to be simultaneously received by the WVP, thereby avoiding signal congestion and/or WVP overload.

In the most preferred embodiments, the WVP has a connection with a certification repository database for verifying the PID transmission of data (i.e. to prove that the user of the PID is registered to use the PID). Preferably, the WVP has a high-speed connection to obtain a public key from the certification repository database in which the PID is registered. In addition, preferred embodiments of a WVP obtain and electronically provide a financial intermediary with the necessary account data for account verification. After the financial intermediary returns a response to the WVP, the WVP will return a message to the PID.

Figure 5:
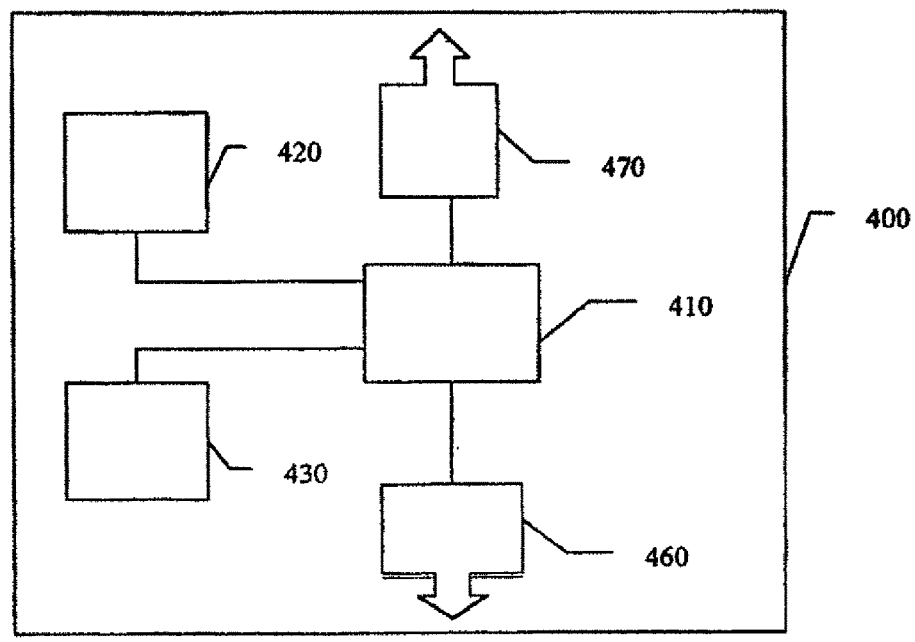
FIG. 5 illustrates a schematic of an embodiment of a verification processor.

Other devices can also interact with a PID. A generic verification processor is shown in FIG. 5. The verification processor 400 includes: at least one processor 410, a verification processor receiver 430 for receiving information from a PID, a certification repository connection 460, and an actuator connection 470. The processor 410 can be part of a general-purpose computer that performs other functions as well as being part of the verification processor 400. Preferably, the verification processor 400 also includes a verification processor transmitter 420 for transmitting information to a PID. Most preferably, the verification processor transmitter 420 and the verification processor receiver 430 are combined into a verification processor transceiver (not shown).

If the verification processor transmitter 420 and receiver 430 or transceiver (not shown) communicate with a PID wirelessly, then the generic verification processor 400 shown in FIG. 5 is a WVP. The WVP discussed in the context of FIG. 4 employs the financial intermediary connection 350 as an actuator connection 470 (as illustrated in FIG. 5). In the context of this invention, the term "actuator" is used very broadly and the financial intermediary is considered an actuator because it performs a user-initiated action, e.g., transferring money from the user account to the vendor account (either account possibly being located at another financial intermediary).

In combination with a PID, the general verification processor (or WVP if wireless) can be used to unlock and/or open access-control mechanisms and locks associated with entryways (e.g., doors and windows), storage devices (e.g., secure filing cabinets) and other systems that need protected entry capabilities (e.g., data centers, databases). In such cases the actuators perform (either directly or indirectly) the unlocking and/or opening function. Actuators can also be used to control entertainment systems, telephones, automated teller machines and computers, and many other high-accountability systems that depend on security to retain the faith of customers and vendors alike.

Before describing more applications of PIDs, verification processors, and systems comprised of these devices and variants thereof, preferred approaches to registering a PID and its user are described.

Preferably, at manufacturing time or at a distribution outlet, each PID will be embedded with a control designation and private keys used for encryption. Upon purchase or ordering, the PID is preferably registered to the user in the physical presence of a verification authority (VA). The VA may be a financial intermediary or some other trusted party that can perform identity verification. In preferred embodiments, the data entered on a PID by a VA must be trusted by others. Any significant lack of trust of the data would largely negate the purpose of having a VA. Hence the VA has a self interest to ensure a certain level of accuracy of the data that it enters.

In many preferred embodiments in which PIDs are issued to employees for providing controlled access to secure locations and/or equipment (e.g., computers, cash registers, vaults, time card punch machines, etc.) the VA might be under the control of company officials (e.g., data center manager, treasurer's office, paymaster office, etc.) while the certification repository database might be maintained by the company security office or the data center system administrator.

To increase trust and credibility for PID users and vendors alike, and in most preferred PID product distribution models, optimally, personal documentation that provides evidence of identity is required at registration. Such trust and credibility evidence might include (but is not limited to) presentation of a picture ID issued by a trusted party (such as a driver's license issued by a state and/or a passport issued by a country), a "social 'security' card" (or other evidence of a personal control number), and/or other necessary and appropriate documentation satisfactory to any or all of the owners of applications intended for receiving PID access inputs by each PID user. Because so many uses and applications are anticipated, the extent of registration credential requirements will vary widely between one individual and another, and will depend on the number and type of security needed to satisfy all applications each PID owner expects to access.

Preferably, in most PID registration scenarios and for most applications, the VA does not maintain any of the personal information, except possibly what is loaded into the certification repository database. However, for "private systems" (usually private, internal company, and custom vertical market applications) it is likely that additional strictures and/or control policies can be implemented, e.g., in a company-wide system for personnel time card management, or in highly secure applications serving necessarily secretive and closed communities (e.g., intelligence agencies, some military and government applications, some private security companies). Additional strictures may also apply for some commercial in-house applications (in-store inventory and control systems, banks, brokerages, high-technology labs, etc.).

At registration, the user initializes the device with user identity data, which will become the stored identity data against which future comparisons are made to establish user identity. The VA will associate the user identity data with the user's identity (name, personal control number, and/or other form of identification) on the PID. Preferably, the PID is designed so that tampering with PID in an attempt to extract the user identity data will result in the destruction of that data. Preferably, the VA does not maintain the user identity data, except possibly for some private applications. Retained user identity data—at least in most "conventional" application environments—are only available only on the PID, in accordance with the spirit of the invention. Again, other custom arrangements are possible to suit needs of the application owner and implementer (particularly in private and custom vertical-market applications, which are usually privately owned).

For a non-biometric PID, the user identity data might consist of a pass code, which is a sequence of symbols, either entered on a keypad, spoken into a microphone, or in some other way communicated to the PID. For the purposes of the invention, the pass code can be as simple as a multi-digit PIN, or can be more complex to include a login/password combination, a pass-phrase, or some other suitable security protocol. For a BPID, the user identity data is biometric. Some possible biometrics that might be used are: digit-prints (thumb or fingerprints), voice data, retinal data, iris data, and DNA data. The biometric data provided to the BPID in the presence of the VA becomes the biometric template on the BPID. Preferably, multiple users can be enrolled to use a particular PID, unless forbidden by any intended application owner (usually only applicable to private systems).

In some embodiments, the VA also verifies additional personal data fields and associates this data with the user on the PID. Such personal data fields might include financial account information, such as credit card and/or bank account information. Other personal data fields, such as address, phone number, marital status, salary, physical characteristics, and medical information may also have values entered and associated with the user. Depending upon the type of information and the target application(s), different types of documentation might be required by the VA. By providing documentation to the VA to substantiate that the values of the personal data fields are valid, the entered personal data field values are considered verified and their values may be traded for discounts on purchases as described later. Preferably, the values of these personal data fields are maintained only on the PID. Preferably, the personal data fields that have been verified will be indicated as such on the PID. The certification repository database preferably includes only the PID identifier (preferably a unique control designation), the PID public key, and a list of user identifications (preferably name and/or other control number(s) pre-agreed by the PID owner and the VA). However, in some embodiments, other information is also included in the certification repository database. For instance, in some embodiments, the certification repository database indicates whether the PID has access to particular financial accounts. Such private information may be restricted so that it is not available to the general public. Preferably, data verified by an in-person meeting with a VA representative is appropriately marked in the PID with a digital certificate or some other notarization from the VA.

Of course much data can also be entered into a PID without going to a VA. For instance, the user could enter credit card information. The software for entering the data would check to ensure that the user identification (name and/or other secure control number(s) pre-agreed by the PID owner and the VA) matched that of the credit card holder, thereby ensuring at least some level of confidence in the correspondence between the user and the cardholder. In some embodiments, any card-providing web site will be capable of securely downloading account data and public keys into the PID. In general practice, the PID will download data from a financial intermediary or other website or download source. The web site software would require the owner of the PID to fill in the necessary information. The web site software will also obtain from the PID its control designation and/or other data.

A PID can also be registered without physically going to a VA. However most PID users are likely to register in person because in-person registration decreases the chance of fraud and therefore increases the number of applications that are likely to be available to the user. In particular, certain, high-security applications, including many vendor applications, may require in-person registration as prerequisite to accessing certain options. PID registration without an in-person meeting with a VA representative would preferably require remote submission of documents and a remote, but interactive session with a VA representative or VA-run software. Most preferably, the interactive session would include real-time video so that the VA representative or the VA-run software could compare the image of the individual seeking to register the PID with a picture ID. This would enable the VA to come to at least a tentative conclusion that the individual matches the picture ID. Real-time video is especially preferred in the case of a BPID, where the user identity data is biometric. The real-time video, although not tamper-proof, provides the VA representative or VA-run software an opportunity to confirm that an individual that resembles the individual on the picture ID is providing the biometric sample that will become the biometric template against which future biometric samples will be compared. Preferably, such remote verification would be appropriately indicated with information stored on the PID. Because of the greater likelihood of fraud with remote registration, some vendors and other applications that desire high security may limit the user options when various aspects of PID registration are performed remotely.

Future advances in personal identification techniques may provide other means in which remote verification of identity can be performed. Alternatively, some application providers may be willing to sustain increased risk in their transactions (particularly in low- or no-security applications) hence remote verification, with or without real-time video may not be an important issue for them.

Figure 6:
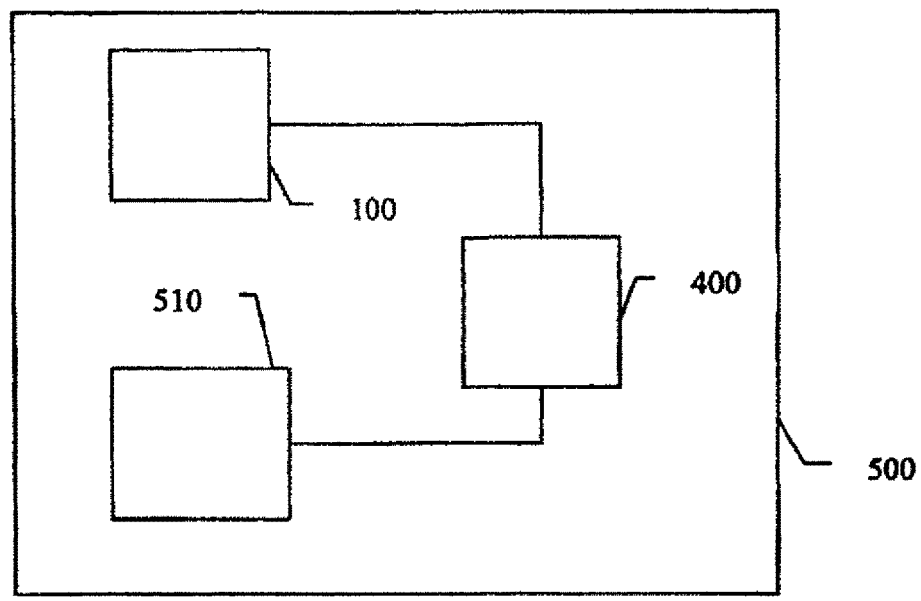
FIG. 6 illustrates a schematic of a verification system.

Systems employing PIDs can be used in many applications. For instance, FIG. 6 shows a verification system 500 that includes a PID 100, a verification processor 400, and an actuator 510. In such a system, the PID 100 is only required to be a portable device that authenticates that a user of the device is privileged to use the device and is privileged to request that the user-initiated action be taken. After authenticating the user privileges, the PID transmits signals that encode: an identification, and an instruction that the user-initiated action be taken. Details of the structure of a PID 100 described above in connection with FIGS. 1 and 2 are not required in such a system. Similarly, a verification processor 400 is a device that receives signals from the PID and verifies that the identification sent by the PID 100 is associated with a PID that is authorized to request that the user-initiated action be taken. Preferably, the identification is the PID control designation. Alternatively, in some embodiments the identification identifies the user of the PID rather than the PID itself. The user identity can be a name, a personal control number, or some other data that identifies the user. After verification, the verification processor 400 signals the actuator 510 to perform the user-initiated action.

The actuator 510 is broadly interpreted to include any means used to accomplish the user-initiated action. For example, in embodiments involving the opening or unlocking of access-ways such as doors and windows, the actuator 510 receives signals from the verification processor 400 and performs the mechanical task of opening or unlocking the access-way, as desired. In other embodiments the actuator 510 processes electrical signals. For instance, in a verification system that interacts with a graphical user interface, the user-initiated action typically involves the movement of a cursor or the selection of an icon. The actuator 510 is the device responsible for the movement of the cursor or the selection of the icon. In other embodiments of verification systems, the actuator 510 manipulates data. For instance, in a verification system used for conducting a financial transaction, the actuator 510 could be a financial intermediary that is responsible for debiting and/or crediting accounts.

Preferably, in such a verification system, the RID is a BPID and therefore the device authenticates that the user of the device is privileged to use the device by determining that a biometric sample collected from the user sufficiently matches a biometric template that stored locally on the BPID.

Preferably, the PID and the verification processor in the verification system communicate wirelessly. Preferably, their communication is encrypted. Most preferably the encryption is performed using a public key/private key algorithm. In such a case, preferably the private key is stored on the PID and the corresponding public key is maintained in certification repository database.

The certification repository database is preferably located on an open network, although in some embodiments, the certification repository database is either local to the verification processor, or located on a closed network available to the verification processor. Preferably the certification repository database links the public key with the identification sent to the verification processor by the PID. The same public key may be available to several identifications. For instance, the identity of multiple users registered to use a single PID might all be linked to the same public key. Also, the certification repository database might associate both PID control designations and user identities to the same public key. In this way, the proper public key could be accessed with either the user identity or the PID control designation.

The verification system described above can be used in a variety of applications. For example, various embodiments expedite user requests that seek access to, and/or control of, enterprise resources and enterprise transactions processing facilities. In such cases, the actuator is the resource to which access is desired, and upon verification that the user is privileged to access the resource, user access is permitted. A typical enterprise resource management environment is a local area network (LAN) in which users are mobile and rove. A roving user may have privileges to access and control only a few computers (e.g., in workgroups similar to his or her own desktop), or the roving user may have more extensive privileges.

Other applications are exemplified by proprietary content browsing (including pay television, pay audio, pay entertainment, royalty-based offerings such as ASCAP or other proprietary music or offerings). In addition, the verification system may be used in conjunction with automated teller machines, pay telephones, information kiosks, vending machines, and simulated inventories. In many of these applications, the user-initiated action may be initiated by the movement of a cursor or the selection of an icon in a graphical user interface.

Further applications involve circumstances in which continuous (or repeated) authentication is required, such as testing (including computer-based programmed instruction, university or scholastic testing), voting, polling, and other applications where continuous or repeated authentication and security are required or helpful to serve all concerned.

A specific example of how the invention might work in the context of a financial transaction is discussed below. In this example, the PID is a BPID, which communicates wirelessly with the verification processor, which is a WVP. A connection to a vendor is also included in this example.

The user selects items for purchase and places them into a shopping cart, (which may be an electronic shopping cart). The vendor sums the purchase prices and any other appropriate charges (e.g., shipping, handling, tax, etc.) to determine a purchase price. The purchase price is communicated to the user either directly, or through a WVP to which the vendor is connected. For an online or Internet purchase, the WVP might be connected to the user's computer and only indirectly connected to the vendor. For a conventional store, the WVP is preferably connected to the cash register or similar equipment. The user activates his/her BPID and indicates a credit card account that the user wishes to use to make the payment. The BPID transmits an encrypted data stream of credit card account data (including the financial intermediary address), date/time stamp, and BPID control designation, and etc. to the WVP. The data stream is encrypted with a BPID private key that was assigned to the BPID either at manufacturing time, or upon registration. The encrypted date/time stamp keeps a "dynamic" data stream (i.e. the same data stream can never be duplicated). The WVP receives the encrypted data stream and decrypts the data with a public key, which is located in a certification repository database, which in this example is a database that contains public keys for each PID. After the WVP verifies that the data came from the appropriate BPID user, the WVP provides the financial intermediary with the necessary account data. The financial intermediary is provided these data in any suitable manner, but most preferably these data are packaged to match the presently used data streams for making financial payments. The financial intermediary is considered the actuator in this case. The financial intermediary takes the implied user-initiated action of checking the data and either approving or disapproving the requested financial transaction, depending upon the status of the user's account. Then an approval/disapproval data stream is returned to the WVP, which further relays the approval/disapproval message appropriately encrypted to the BPID and to the vendor. The user then indicates with the BPID go forward with the purchase. The appropriately encrypted message is sent to the WVP, which forwards the message to the vendor (which is the actuator for this portion of the process). The vendor then completes the sale as usual. In some embodiments, a record of the transaction is maintained on the BPID. This record can later be downloaded to the user's choice of personal accounting system.

In applications involving financial transactions, multiple layers of encryption are preferred. An example of an embedded encryption procedure is described below. Numerous alternative procedures could also be employed.

In a preferred procedure, each account included on the PID will be associated with a public key provided by the financial intermediary that issued the account, or provided indirectly via a public key repository. When the user of a PID selects an account to use in a specific financial transaction, the PID appends date and time information to the account information and encrypts the data stream with the public key associated with the selected account. The use of date and time information forces the encrypted bit pattern to be different every time the PID is used to make a financial transaction. The differing bit patterns guarantees that a signal intercepted by a third party cannot be simply repeated to gain access to the account (a.k.a. "replay attack").

After encrypting the date, time, and account information with the public key of the account, the PID control designation and the financial intermediary address (or some other indicator of the financial intermediary) are appended and encrypted with the private key associated with the PID. The PID control designation is then appended to the resultant data stream.

The embedded encrypting provides the opportunity for increased security and privacy. With the above encrypting procedure, the device that receives the data from the PID would first consult a table of public keys to find the public key associated with the PID. This public key would be used to decrypt the information encrypted with the PID private key. Decrypting this information gives the receiving device access to a second copy of the PID control designation. The receiving device should confirm that the two copies of the PID control designation match. At this point, the receiving device also has access to the financial intermediary address and can route the remaining information to the financial intermediary. Because this information was encrypted with the public key associated with the account in the indicated financial intermediary, decrypting the information requires the corresponding private key, which presumably is maintained by the financial intermediary.

Numerous variations to the encryption strategy can be used in various embodiments. In particular, hybrid schemes that exploit both asymmetric and symmetric algorithms may provide the convenience and security of asymmetric algorithms with the inherent speed advantage of symmetric algorithms. In a hybrid scheme, an asymmetric encryption algorithm is used to encrypt a key to a symmetric algorithm, which is used to encrypt the bulk of the message.

Any of the described encryption schemes may be used in whole or in part in combination with various aspects of the invention.

Figure 7:
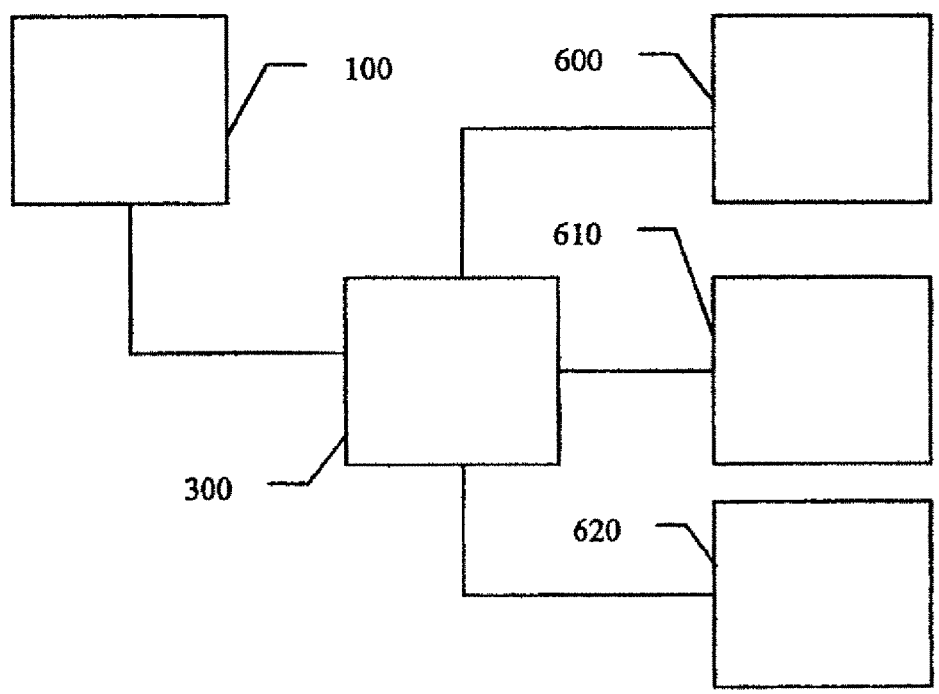
FIG. 7 shows a schematic of a system by which a payer conveys a payment to a payee.

In addition to the general verification system described previously, the invention includes related systems specifically designed for a payer to convey a payment to a payee. A schematic of an embodiment of such a system is illustrated in FIG. 7. The system includes a PID 100, an information processor 300, and a financial intermediary component 600. In this system, the PID 100 authenticates that a user of the PID 100 is privileged to use the PID 100 and is privileged to request that a payment be charged against a payer account. The PID 100 then transmits signals to an information processor 300. These signals include the payer account data and the payer financial intermediary address. The information processor 300 receives signals from both the PID 100 and from the payee 610. The signals from the payee 610 include the payee account data and the payment amount. The information processor 300 then forms a payee payment packet that includes the payer account data, the payee account data, and the payment amount, and sends the payee payment packet to the payer financial intermediary address The financial intermediary component 600 receives the payee payment packet and transfers money from the payer account at the payer financial intermediary to the payee account at the payee financial intermediary. In some embodiments, the payee 610 acts as his/her own financial intermediary, in which case, the transfer of funds is made directly to the payee 610. The payer can also act as his/her own financial intermediary, but such an arrangement would not change the flow of information.

Note that the user of the PID 100 does not need to be the payer, but must have privileges to use the PID 100 and have privileges to request that a payment be charged against the payer account. For example, the user of the PID 100 might be a child of the payer. The child might have limited privileges to use the PID 100. For instance, some accounts might be off limits or might have per transaction or per month limits imposed. How such limits are imposed and changed is specific to various PID embodiments. Preferably, all such information is local to the PID 100.

In preferred embodiments the authentication that the user of the PID 100 is privileged is done by determining that a biometric sample collected from the user sufficiently matches a biometric template stored on the PID 100 (which in such a case is a BPID) and associated with the selected payer account data.

In preferred embodiments, the communication between the PID 100 and the information processor 300 is wireless.

Preferably, the information processor 300 verifies that the payer account data is valid, preferably by communicating with the payer financial intermediary.

Preferred embodiments of the system further include a certification repository database 620. In these preferred embodiments the certification repository database 620 includes PID control designations and registered users. The PID 100 transmits the PID control designation to the information processor 300, which checks the certification repository database 620 to verify that the PID control designation corresponds to a PID 100 that is registered for use by the payer. In a typical embodiment, the payer identity is registered in the certification repository database 620 and is associated with the PID control designation. Preferably, the verification by the information processor 300 occurs with the use of a public key that is located in the certification repository database 620.

In an example verification process, the user is authenticated to the PID 100, either through a biometric, a pass code, or some other means. The PID 100 then obtains a public key from the information processor 300. The PID 100 encrypts its PID control designation using the public key of the information processor 300. This information is transmitted to the information processor 300, which decrypts the information using its private key. The information processor 300 then consults the certification repository database 620, where the public key of the PID 100 that corresponds to the PID control designation is obtained. A challenge message is encrypted with the public key of the PID 100 and transmitted to the PID 100. The challenge message is decrypted by the PID 100, then re-encrypted using the public key of the information processor 300, then transmitted back to information processor 300. The information processor 300 decrypts the challenge message using its private key. If the challenge message matches the challenge message that it originally sent, then the PID 100 is verified as having the proper private key that corresponds with the PID control designation originally sent to the information processor. Variations to such public key/private key verifications known to those skilled in the art are included within the meaning of verifications using public keys. Verification that a user identity is associated with a particular PID control designation in the certification repository database 620 is preferably done simultaneously with the previously described checks. However, various embodiments may verify that the user is registered to use the PID 100 either before or after the PID control designation is checked.

Figure 8:
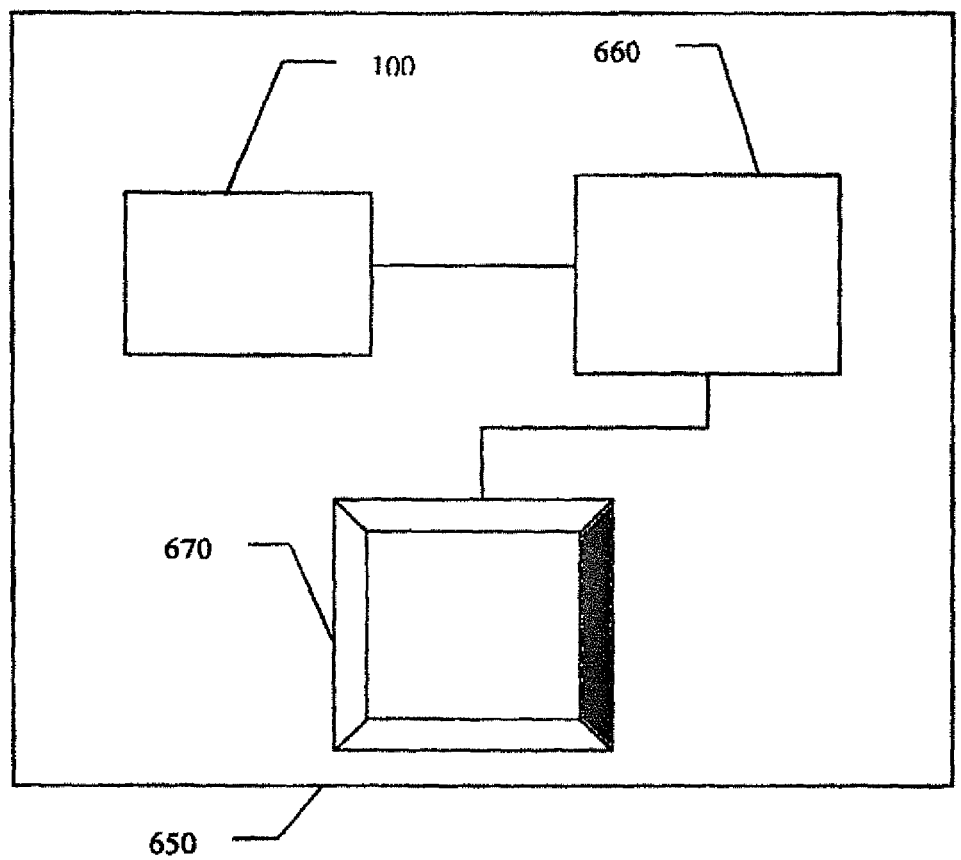
FIG. 8 illustrates a schematic of a simulated inventory system.

A related system involves a simulated inventory system, as shown schematically in FIG. 8. As used here, a simulated inventory is visual representation of a catalog, index, directory, or other content. Referring to FIG. 8, a simulated inventory system 650 comprises a simulated inventory display 670, a simulated inventory controller 660 that controls the interaction of at least one cursor with at least one icon on the simulated inventory display 670, and a PID 100.

Preferably the simulated inventory takes the form of either a two-dimensional or three-dimensional graphical user interface that is displayed on the simulated inventory display 670. Three-dimensional graphical user interfaces can be produced with perspective on a surface (either flat or curved) or (in advanced, premium applications) through the use of holographic images. The use of the phrase "on the simulated inventory display 670" is intended to include both projections onto a surface and holographic projections, in which the preposition "in" would be more appropriate.

The term "cursor" is used here to mean an easily recognizable indicator of the user's position in the simulated inventory. In this application, the cursor, (or an avatar in embodiments in which an avatar is used as the cursor), is displayed on the simulated inventory display 670, allowing the PID user to manipulate product images and icons.

In simulated inventory systems 650, the PID 100 is a portable device that authenticates that a user of the device is privileged to use the device. In addition, the PID 100 in these systems includes some of the elements shown in FIGS. 1 and 3 and previously discussed. In particular, in simulated inventory systems, the PID includes a transmitter 120, a user input module 140 that receives inputs from the user, and a processor 110 that receives the inputs and provides corresponding signals to the transmitter 120. The signals sent by the transmitter 120 are received and processed by the simulated inventory controller 660, which then updates the image on the simulated inventory display 670.

A positional sensor 149 (shown in FIG. 1) is particularly useful for manipulating a cursor through a three-dimensional simulated inventory. The orientation of the PID 100 can then be used as an additional user input to guide movement of the cursor.

Unless required by the simulated inventory controller 660, the real identity of entity controlling any particular cursor need not be revealed.

The simulated inventory display 670 is preferably individualized for each PID 100 that is part of the system. These embodiments require at least one simulated inventory display 670 for each PID 100. Alternate embodiments employ fewer simulated inventory displays 670 and include individualized cursors for each PID. Such systems might be used in a hybrid physical-simulated shopping environment. Customers would physically gather at one or more locations that include a simulated inventory display 670. At these locations, the customers could enter the simulated inventory system 650 and search for and perhaps purchase the desired goods and/or services. The goods and/or services could then be immediately retrieved, rather than requiring shipping.

The apparatuses and systems described above facilitate new methods for conducting transactions. However, unless the methods described below specifically state that one or more embodiments of the above-described apparatuses and/or systems are necessary, the methods are not required to include the above-described apparatuses and/or systems.

One new method is a method for discounting a deliverable that has a price. In an embodiment of the invention, a party receives from the customer a value for at least one prescribed personal data field. The value of the at least one prescribed personal data field is certified as corresponding to the customer. Finally, the price of the deliverable is reduced by a prescribed discount. The prescribed discount is independent of the value of the prescribed personal data field. The discount depends only on the fact that the customer has provided a value for the prescribed data field.

Preferably, a PID is used for certifying that the personal data field corresponds to the customer. Most preferably, documentation is provided to the VA during PID registration that indicates the values of various personal data fields. The VA has software and hardware that associates these values of the personal data fields with the appropriate registrant of the PID. When a PID authenticates the identity of a customer as a particular registrant of the PID, the values of the personal data fields associated with that registrant are considered to be certified. Although certification through the use of a PID is preferred, any other suitable means may be used to certify that the personal data field corresponds to the customer.

In some embodiments, the certifying step for this method includes collecting a biometric sample from the customer and authenticating that the collected biometric sample sufficiently matches a biometric template associated with a verified set of personal data field values. Although not necessary, these embodiments are preferably facilitated with the use of BPID. In the case of a BPID, the original biometric template is provided to the BPID in the presence of the VA. Thereupon the VA associates the registrant identity and any documented personal data field values with the biometric template. The particular biometric template used is not critical. Various embodiments employ digitprints, handprints (evaluation of hand geometry), voice data, retinal data, iris data, and DNA data. In preferred embodiments, security provisions in the BPID prevent the biometric template from being altered except through the hardware and software provided to the VA. However, other embodiments allow the biometric template to be updateable, either at intervals chosen by the BPID hardware and/or software, or by the user of the BPID.

Non-biometric methods for certifying that the values of personal data fields correspond to the customer are also possible. For instance, in some embodiments a handwriting sample is collected from the customer. If the collected handwriting sample sufficiently matches a stored handwriting sample associated with a verified set of personal data field values, then the values of the personal data fields are certified. If a PID is used, a similar registration process to that used with the biometric template can be used to ensure that the personal data field values are verified and that the stored handwriting sample corresponds to them. However, in this case, rather than providing a biometric template, a handwriting sample is provided. Some embodiments of PIDs are equipped with handwriting input and analysis hardware and software to automatically authenticate a user's handwriting. Similarly, in various embodiments, a pass code is used to authenticate the identity of a user. Although the use of a PID is preferred, its use is not required.

To arrive at the appropriate discount for the deliverable, some embodiments of the method prescribe a negotiation. The negotiation may be between the customer and the vendor, the customer and the manufacturer, or the customer and some other party. The negotiation is defined as a communication or set of communications that seek to determine an acceptable discount that will be granted in exchange for values of selected personal data fields. As an example, a vendor might desire the customer's name, address, and phone number in exchange for the grant of a discount of X. The customer might be willing to provide name and address information, but not the phone number. The negotiation will attempt to find some set of personal data fields that are worth some discount to both the vendor and the customer. In the example given above, the vendor might agree to accept the customer's name, address, and email address in exchange for a discount Y that is somewhat less than X.

In preferred embodiments, the determination of which prescribed personal data fields the customer will provide with values and the prescribed discount that the customer will receive, are the result of an optimization algorithm based upon constraints and cost functions that are specified by the customer and the discounter. Constraints are conditions that are not to be violated. For instance, in the prior example the customer was willing to provide a value for the customer's email address, but not for the customer's telephone number. The refusal of the customer to provide a telephone number is a constraint. Cost functions are mathematical descriptions of penalties associated with a non-optimal result.

In simple examples, cost functions are just numerical values that are associated with various possible outcomes. For example, in the prior example, the vendor optimally desired the customer's name, address, and telephone number. A zero value of the vendor's cost function would be associated with this outcome. However, the vendor was willing to accept the customer's email address in place of the customer's telephone number if the discount was modified from X to a smaller value of Y. In spite of providing a smaller discount, the vendor is not as pleased with this outcome as he/she would have been had the customer agreed to provide the customer's telephone number. Hence the cost function is nonzero, in this example, let us assign the vendor's cost function to be 1 to this situation. In this example, assume that the vendor would also have accepted the customers name and address in return for a much smaller discount, Z. This outcome was less optimal to the vendor and the vendor's cost function was 3. The customer will also have a set of cost functions. For instance, a value of 1 might be assigned to the trade of the customer's name and address for a discount of Z. A value of 2 might be assigned to the trade of the customer's name, address, and email address in exchange for a discount of Y. The customer constraint prohibits any consideration of releasing the customer's telephone number. An optimization algorithm would determine the least costly outcome consistent with the constraints. In this case, the sum of the customer's cost function and the vendor's cost function is 4 if the customer provides only name and address values in exchange for a discount of Z. On the other hand, the sum of the cost functions is 3 if the customer provides a name, address, and email address in exchange for a discount of Y. The latter option minimizes the cost functions while still complying with the constraints; hence it is the optimal outcome of this example.

In the above example, integer values were assigned to the individual outcomes. In general, the value of the cost functions for different outcomes will be non-integers. Also in the above example the customer's cost function was specified at the precise discounts specified by the vendor's cost function. In general, interpolation will be required to determine the appropriate values of the cost function. For instance, both the vendor and the customer might specify cost function values for a range of discounts for the same prescribed personal data fields. Discounts outside of the specified range could optionally have their cost function either extrapolated or set to some preset value.

Although the method requires that the value of at least one prescribed personal data field is certified as corresponding to the customer, not all personal data fields used in the optimization scheme need to be certified. Typically, personal data fields that relate to personal preferences and/or hobbies are difficult to document and therefore would likely be non-certified. In addition, some individuals may not wish to go to the trouble of having a VA certify a new address or phone number, hence their entries in those personal data fields would not be certified. Non-certified personal data fields are likely to be less valuable to the discounter, but may nonetheless have significant value. The importance of whether a particular personal data field is certified or not is specified by assigning a separate cost function and/or separate discount to either case.

Whether the value of a particular personal data field is restricted to use by the discounter or can be sold or transferred to another entity also enters into the optimization process. Different discounts and/or cost functions can be assigned to personal data fields depending upon whether or not the information is restricted to the discounter. In preferred embodiments, all transferred information is restricted to the discounter, but such a restriction is not required.

When a PID is used to facilitate this method of discounting, preferably the cost functions are set during enrollment of the PID. A set of default cost functions are optionally made available for those PID users not wishing become involved in the details of setting their own. In most embodiments, the cost functions may be changed or set at some later time without the involvement of a VA.

Figure 9:
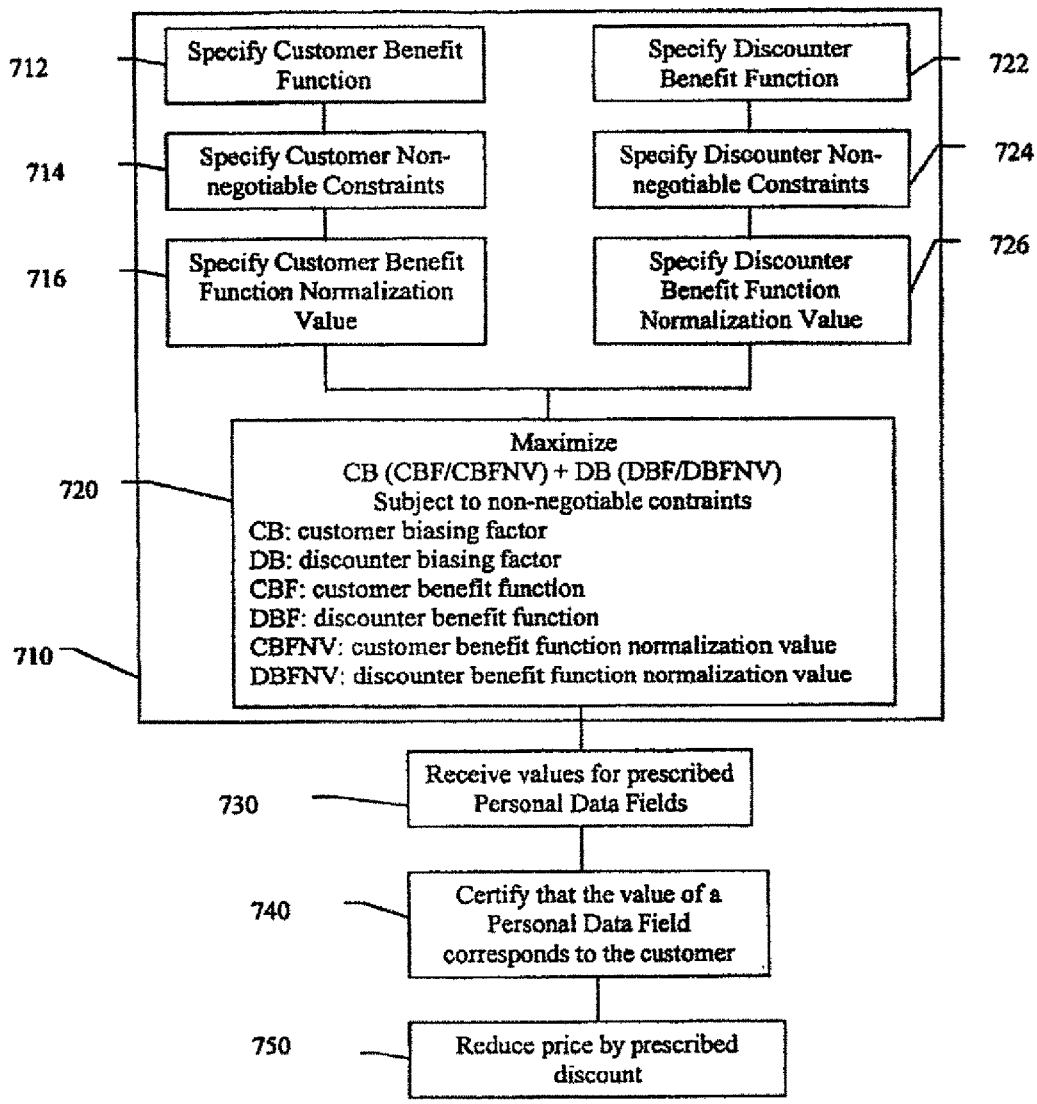
FIG. 9 shows a method for discounting a deliverable.

A benefit function can be interpreted as an inverse cost function. The benefit function describes how satisfied the entity is with any appropriate outcome. An optimization algorithm would seek to maximize benefit functions. A preferred embodiment of the method employing benefit functions is illustrated in the schematic of FIG. 9 and is described below.

In these preferred embodiments, the customer specifies a customer benefit function (CBF) 712 that relates how satisfied the customer would be to receive a specified discount in return for the value of a specified personal data field. The customer also specifies any customer non-negotiable constraints 714 on individual personal data fields or combinations of personal data fields. For instance, the customer might be willing to provide either a telephone number or an address, but not both.

Similarly, the discounter specifies a discounter benefit function (DBF) 722 that relates how satisfied the discounter would be to provide a specified discount in return for the value of a specified personal data field. The discounter also specifies any discounter non-negotiable constraints 724 on individual personal data fields or combinations of personal data fields. For instance, the discounter might insist on receiving both a telephone number and an address, In these embodiments, the customer also needs to specify a customer benefit function normalization value (CBFNV) 716. The CBFNV normalizes the customer benefit function. In preferred embodiments, the CBFNV is related to some minimum nonzero value of the customer benefit function that the customer considers satisfactory. Although not required, in some embodiments, this minimum value of the customer benefit function is explicitly imposed as a non-negotiable constraint.

Similarly, the discounter specifies a discounter benefit function normalization value (DBFNV) 726. In preferred embodiments, the DBFNV is related to some minimum nonzero value of the discounter benefit function that the discounter considers satisfactory. Although not required, in some embodiments, this minimum value of the discounter benefit function is explicitly imposed as a non-negotiable constraint.

In preferred embodiments the CBFNV and the DBFNV correspond to minimum values of their respective benefit functions that are satisfactory to the customer and the discounter respectively. In such embodiments, the ratios CBF/CBFNV and DBF/DBFNV can be directly compared because both represent a level of satisfaction that is normalized with a minimum level of satisfaction acceptable to the respective parties. In the most preferred embodiments, the minimum acceptable values are imposed as non-negotiable constraints. By imposing the minimum acceptable values as non-negotiable constraints, the ability of both the customer and the discounter to manipulate numbers in their favor by choosing an artificially low customer or discounter benefit function normalization value is reduced. In such embodiments, setting an artificially low value may result in actually obtaining an outcome that corresponds to that artificially low benefit function value. Imposing a greater minimum value eliminates the possibility of considering outcomes with lower values of the respective benefit functions.

If any of the non-negotiable constraints are not met, no discount is provided and the customer is not obligated to provide values for any personal data fields. Similarly, if either the customer benefit function or the discounter benefit function is less than the specified minimum value acceptable, no discount is provided and the customer is not obligated to provide values for any personal data fields.

Although benefit functions may be established in any way acceptable to both the customer and the discounter, preferred embodiments are described below.

In the preferred embodiments, to establish benefit functions, benefit values are chosen for various outcomes. Outcomes not explicitly specified are constructed from the specified benefit values.

As an example, consider the benefit values assigned by a customer in Table 1. Four personal data fields, labeled 1-4 are used. Discounts may be specified as either absolute amounts or percent of purchase price. In this example, the preferred practice of specifying the discounts in terms of percent of the purchase price is used. The table specifies the customer benefit value assigned to outcomes in which discounts range from 1% to 4%. The fifth and sixth columns provide benefit assignments for combinations of personal data fields. In preferred embodiments, when combination fields are provided, the combination field including the greatest number of fields takes precedence over sums of individual fields and/or combination fields with fewer fields.

The customer benefit function is the sum of the benefit values for any particular outcome. Interpolation is used to establish the customer benefit for cases between those specified. Depending upon customer preference, extrapolation, or a default value is used for cases out of the range of the table. Because different ways of arranging a combination of fields to achieve a specified discount exist, a procedure for choosing which combination to use must be established. In preferred embodiments, the combination that gives the maximum sum of the customer benefit values is chosen, and the sum is the customer benefit function. However, other embodiments choose the combination that produces the minimum sum. Still other embodiments choose an average of the possible sums to be the customer benefit function.

To better understand how the table is used in practice, consider a possible outcome in which the values of personal data fields 1 and 2 are traded for a discount of 5%. Because the combination of fields 1 and 2 is not separately provided, the customer benefit function is determined by evaluating the possible ways in which fields 1 and 2 can be combined for a 5% discount. In this example, the maximum of the sum of the benefit values of the different combinations in which fields 1 and 2 can be combined will be chosen for determining the customer benefit function. A 1% discount for field 1 (customer benefit value of 1) and a 4% discount for field 2 (customer benefit value of 4) result in a total of a 5% discount and give a sum of 5 (1+4). We can also consider a 2% discount for field 1 (customer benefit value of 1) and a 3% discount for field 2 (customer benefit value of 3), resulting in a sum of 4. Because 4 is less than 5, the maximum sum is still 5. All the other combinations also give sums of 4, therefore the maximum remains 5 and the customer benefit function is 5.

Now consider a case in which fields 1 and 3 are desired for a total discount of 3%. Because the combination of fields 1 and 3 is specified in the table, the customer benefit function is simply read from the table as 2.

Finally consider a case in which fields 1, 3 and 4 are desired in exchange for a discount of 5%. Because the combination field 1 and 3 is specified, the customer benefit function is evaluated by considering different ways in which the 1 and 3 column can be combined with the field 4 column to provide a total discount of 5%. By searching for the maximum, a customer benefit function of 4 is found. Although this particular table does not include a column for the combination field 1 and 4, if such a column was provided, the determination of the customer benefit would also need to consider ways in which the combination field 1 and 4 could be combined with field 3. In this example, the maximum over all the combinations becomes the customer benefit function. However, if fields 1-4 were desired for 5% discount, only combinations of the combined 1, 2, and 3 fields (rightmost column) with field 2 would be considered because precedence is given to combination fields that include the most fields.

In practice, the customer may choose default customer benefit function values.

Clearly discounter benefit functions can be determined similarly using a table specified by the discounter.

The optimization algorithm may bias the optimization with the use of a customer biasing factor (CB) and a discounter biasing factor (DB). Preferably CB=DB=1, which is equivalent to not using either biasing factor. If CB>DB, then the optimization algorithm favors the customer. If CB<DB, then the optimization algorithm favors the discounter.

The optimization algorithm determines which personal data fields are prescribed and what the prescribed discount is by maximizing the sum of the product of the customer biasing factor with the ratio of the customer benefit function to the customer benefit function normalization value and the product of the discounter biasing factor with the ratio of the discounter benefit function to discounter benefit function normalization value, subject to any customer non-negotiable constraints, and any discounter non-negotiable constraints.

As shown with reference numeral 720 in FIG. 9, mathematically, the optimization algorithm maximizes:

CB(CBF/CBFNV)+DB(DBF/DBFNV)

without violating any of the non-negotiable constraints imposed by the either the customer or the discounter, respectively. If no outcome satisfies the constraints, no discount is provided and the customer does not need to provide values for personal data fields.

TABLE 1

| Discount | Field | | | | | |
|---|---|---|---|---|---|---|
|  | 1 | 2 | 3 | 4 | 1 & 3 | 1, 2, & 3 |
| 1% | 1 | 1 | 1 | 1 | 0 | 0 |
| 2% | 1 | 2 | 1 | 2 | 1 | 1 |
| 3% | 2 | 3 | 1 | 2 | 2 |  |
| 4% | 3 | 4 | 2 | 3 | 3 | 2 |

The entire process circumscribed by the outer box 710 of FIG. 9 provides a preferred method of determining what are the prescribed personal data fields and what prescribed discount will be provided in return for the values of those fields. After the prescribed personal data fields are determined, the discounter receives values for those prescribed personal data fields 730. The value of a personal data field is certified as corresponding to the customer 740 and the price of the deliverable is reduced by the prescribed discount 750.

Other embodiments of the invention include methods by which a payer conveys a payment to a payee. In various embodiments of such methods payer payment information includes: a payer financial intermediary address corresponding to an appropriate payer financial intermediary, payer account data that specifies a payer account from which payment is to be made, and a PID control designation. In this context the PID control designation is an identifying sequence of data given to a PID and in this context a PID is a portable device that authenticates that a user of the device is privileged to make a payment from the payer account specified in the payer account data. Other aspects of PIDs described earlier are not necessary in this context.

Figure 10:
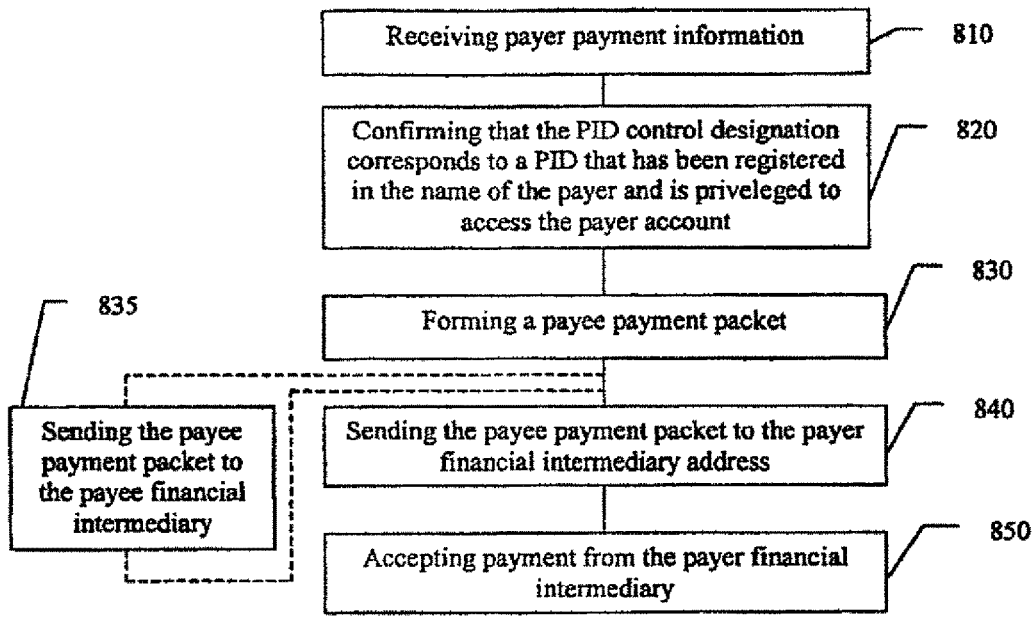
FIG. 10 illustrates a method by which a payer conveys a payment to a payee.

As shown in FIG. 10, various embodiments of these methods include the steps of receiving payer payment information from the payer 810, confirming that the PID control designation corresponds to the PID that has been registered in the name of the payer and is privileged to access the payer account 820, forming a payee payment packet 830, sending the payee payment packet to the payer financial intermediary address 840, and accepting payment from the payer financial intermediary 850. In this context, the payee payment packet includes the payer account data, payee account data, and a payment amount. Although not required in all embodiments, the steps of FIG. 10 are performable solely by the payee.

In various embodiments, the payee takes the role of both the payee and the payee financial intermediary.

In some embodiments the step of sending the payee payment packet to the payer financial intermediary address 840 is performed via the payee financial intermediary, as indicated by the dashed lines leading to and from step 835. These embodiments follow more closely current credit-card practice in which the payee (typically a vendor) sends data to the payee financial intermediary and the payee financial intermediary forwards information to the payer financial intermediary.

Various embodiments of this method for conveying a payment include the step of debiting the payer account by the payment amount plus a payer surcharge. The payer surcharge may be a sum of surcharges assessed by multiple entities. In preferred embodiments the payer surcharge is zero. In preferred embodiments, the step of accepting payment from the payer financial intermediary occurs when the payee account is credited by the payment amount minus a payee surcharge. Although the payee surcharge may be zero, it is nonzero in most preferred embodiments. The payee surcharge may be the sum of surcharges assessed by multiple entities. In particular, the multiple entities that assess surcharges in preferred embodiments include the payee financial intermediary, the payer financial intermediary, and a credit-card company. In other embodiments different entities may assess surcharges.

In preferred embodiments, the step of confirming that the PID control designation corresponds to the PID registered in the name of the payer and is privileged to access the payer account 820 is performed by consulting a certification repository database. In these embodiments the certification repository database includes information as to whether or not the PID is allowed to access particular accounts. However, this information may be restricted, for instance to particular vendors or financial intermediaries. In some embodiments, the payer financial intermediary maintains the certification repository database. In some embodiments different databases are consulted for confirming that the PID has been registered to the payer and that the payer is privileged to access the payer account.

In preferred embodiments, the payer account data is encrypted. Encryption reduces the chance that confidential payer account data can be used by an unauthorized or an unintended party. In many preferred embodiments most (if not all) data transfers are encrypted, not just those containing account data. Encrypting the payer account data, allows the payer account data to be handled by the payee without providing the payee with access to the payer account data. Preventing the payee from having access to the payer account data is important in many embodiments.

The most preferred embodiments employ a BPID (biometric personal identifying device) rather than a non-biometric PID. In these embodiments, the PID authenticates that the user of the device is privileged to make a payment from the payer account by determining that a biometric sample collected from the user sufficiently matches a biometric template associated with the payer account data, and wherein the biometric template is stored locally on the PID. To reduce the possibility of fraud, preferably the biometric sample collected from the user is collected within a preset time period, prior to payer payment information reception by any payee. Without such a "time-out" period, unauthorized transactions could be made by others after the BPID had authenticated a particular user.

The particular biometric that is used to authenticate the user differs with different embodiments. For instance, in various embodiments the biometric sample can be one or more biometrics, including a digit-print, a handprint, voice data, retinal data, or DNA data. Other embodiments employ combinations of various biometrics.

Preferably, a VA (verification authority) had associated the payer account data with the biometric template on the PID. This would typically be done at registration or at some later time. Because the VA has a self interest in providing trusted service, the VA preferably requires documentation that the payer account data should be accessible by the provider of the biometric template before the VA associates the payer account data with the biometric template on the PID. The use of a VA adds confidence to the veracity of the association between the biometric template and the payer account data. In preferred embodiments, security provisions in the PID allow only the VA can change the association of data on the PID. In other words, any data associated with a particular biometric template, is only changeable by a VA. In some embodiments, the biometric template is updateable, either by the VA or through some other trusted security administrator or system administrator means.

In various embodiments of the method, an additional step is included that confirms that the payer account has sufficient solvency to be debited by the payment amount. Preferably, this confirmation is performed by the payer financial intermediary.

A similar set of embodiments by which a payer conveys a payment to a payee, includes the steps of: receiving payer payment information from a payer 810, forming a payee payment packet 830, sending the payee payment packet to the payer financial intermediary address 840, and accepting payment from the payer financial intermediary 850. In this set of embodiments, the payee payment packet includes the HD control designation, the payer account data, the payee account data, and a payment amount. Because the PID control designation is included in the payee payment packet, the step of confirming that the PID control designation corresponds to a PID that has been registered in the name of the payer, and is privileged to access the payer account 820, can be accomplished by some party that receives the payee payment packet. Additional embodiments corresponding to those described for the prior method by which a payer conveys a payment to a payee are applicable here.

Figure 11:
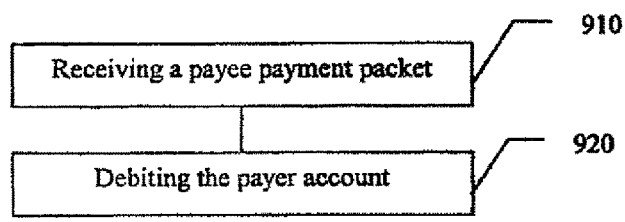
FIG. 11 shows another embodiment of a method by which a payer conveys a payment to a payee.

FIG. 11 illustrates another related set of embodiments in which a payer conveys a payment to a payee. This set of embodiments includes the steps of receiving a payee payment packet 910 and debiting the payer account by the payment amount plus a payer surcharge 920. In this set of embodiments the payee payment packet includes payee account data, a payment amount, payer account data, and a PID control designation. In the context of these embodiments, the PID control designation is an identifying sequence of data given to a PID and a PID is a portable device that authenticates that a user of the device is privileged to make a payment from the payer account specified in the payer account data. Although not mandatory, these steps may be performed solely by a financial intermediary. Inclusion of the PID control designation in the payee payment packet distinguishes this set of embodiments from more conventional methods of conveying a payment. As in embodiments discussed earlier, the payer surcharge may be zero.

Additional embodiments further include the step of transferring to the payee account the payment amount minus a payee surcharge. The payee surcharge may be zero, or it may be a sum of surcharges assessed by various entities.

Transferring the PID control designation as part of the payee payment packet facilitates confirming that the PID control designation corresponds to the PID that has been registered in the name of the payer and is privileged to access the payer account in some embodiments.

In preferred embodiments, the PID authenticates that the user of the device is privileged to make a payment from the payer account by determining that a biometric sample collected from the user sufficiently matches a biometric template associated with the payer account data. As in other cases described above, the biometric template is stored locally on the PID.

Another embodiment of the invention employs the transfer of a bearer financial instrument to convey a payment. Preferably, the bearer financial instrument (in most cases) is some form of a secure, private electronic certificate.

In some preferred embodiments, the bearer financial instrument takes the form of electronic script, as described in U.S. Pat. No. 6,122,625 to Rosen, which is included herein by reference in its entirety. In other preferred embodiments, the bearer financial instrument takes the form of digital bearer cash, a model for which is described by Hettinga ("A Market Model for Digital Bearer Instrument Underwriting,"<www.philodox.com/modelaper.html>, revised on Sep. 8, 1998), which is included herein by reference in its entirety. The particular form of the bearer financial instrument is not critical to its use in the invention. However, preferred forms of bearer financial instruments to be used with the invention can be transferred between parties without the direct involvement of a financial intermediary.

In such a method for conveying a payment, a PID authenticates the identity of the payer. In this method, the PID is required only to be a portable device that authenticates that a user of the device is privileged to use the device and has transference privileges to a bearer financial instrument stored on the PID. The bearer financial instrument is then transferred to the payee, preferably by electronic means. Authentication of the payer is preferably accomplished by determining that a biometric sample collected from the user of the PID sufficiently matches a biometric template associated with transference privileges of the bearer financial instrument.

Figure 12:
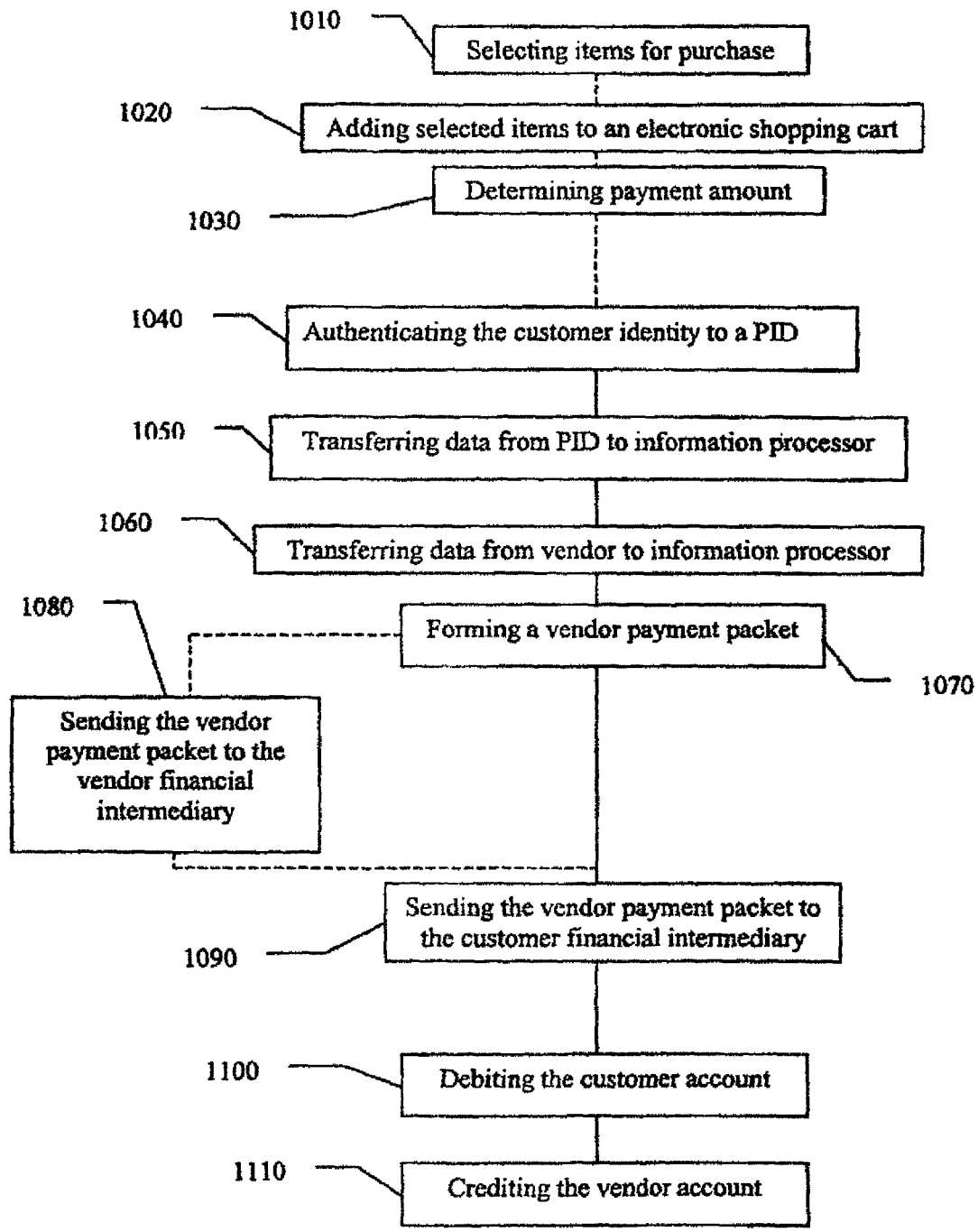
FIG. 12 illustrates a method for a customer to make a purchase from a vendor.

Other embodiments of the invention relate to methods for a customer to make a purchase from a vendor. As shown in FIG. 12, these embodiments include a number of steps. A PID authenticates the customer identity 1040. In this context a PID is a portable device that authenticates that a user of the device is privileged to use the device and is privileged to request that a payment be charged to a customer account at a customer financial intermediary. Preferably after authenticating the customer identity, the PID transfers customer account data and a customer financial intermediary address to an information processor, which is a component that receives signals from both the customer and the vendor 1050. The vendor transfers vendor account data and a payment amount to the information processor 1060. A vendor payment packet is formed 1070. The vendor payment packet includes the customer account data, the vendor account data, and the payment amount. Preferably after being formed, the vendor payment packet is sent to the customer financial intermediary address 1090. As with the other related processes previously described, the data sent to the customer financial intermediary address need not be sent there directly, but may be sent there via another entity. Such an embodiment is shown with the dashed lines in which the vendor payment packet is sent to the vendor financial intermediary 1080, which then sends the vendor payment packet to the customer financial intermediary 1090. The customer account at the customer financial intermediary is debited by the payment amount plus a customer surcharge 1100, and the vendor account at the vendor financial intermediary is credited by the payment amount minus a vendor surcharge 1110. In some embodiments the customer and/or vendor surcharges are zero.

Preferably the PID authenticates the customer identity by determining that a biometric sample collected from the customer sufficiently matches a biometric template associated with the customer account data.

Various embodiments of the methods for a customer to make a purchase from a vendor also include the optional steps indicated by dashed lines at the top of FIG. 12. These steps include selecting items for purchase 1010, adding the selected items to an electronic shopping cart 1020, and determining the payment amount for the selected items in the electronic shopping cart 1030. In some embodiments the step of selecting items for purchase is performed via a graphical user interface. In preferred embodiments, the graphical user interface is a simulated retail store. The simulated retail store may be rendered either as a two-dimensional layout or may use perspective to render the simulated retail store in three dimensions. In some preferred embodiments a holographic graphical user interface is used to facilitate the selecting of items for purchase. In embodiments that employ a graphical user interface, the electronic shopping cart may be maintained either on the PID until checkout or by the vendor. In preferred embodiments a record of the transaction is maintained on the PID for later download to the customer's choice of personal accounting software.

In some embodiments, the customer physically moves through a store and selects items to be added to the electronic shopping cart. In preferred embodiments the physical items are retrieved from a storage facility at checkout, i.e. when the customer has completed shopping and is ready to finalize the purchases. In some embodiments, the electronic shopping cart is maintained on the PID and is transferred to the information processor at checkout. In other embodiments the electronic shopping cart is maintained by the vendor. In these embodiments the items are selected for purchase by sending a signal containing a customer identifier from the PID to a vendor electronic shopping cart processor. The electronic shopping cart processor maintains an electronic shopping cart for each customer identifier. This information is provided to the information processor at checkout. In preferred embodiments the customer identifier is the PID designator. Other embodiments use the customer name, or a customer-chosen identifier to be the customer identifier. Still other embodiments use a vendor assigned identifier as the customer identifier. In some embodiments, electronic shopping carts associated with multiple PIDs are merged at checkout. Such embodiments are useful when families with multiple PIDs go shopping. Merging their individual shopping carts at checkout can facilitate gathering and loading the merchandise as well as consolidating the finances.

To select items for purchase in a physical environment, the customer may enter a code for each selected item into the customer's PID. However, such embodiments are tedious and error prone. To facilitate the selection of items in a physical environment preferred embodiments use an item designator. An item designator is a general device that perceives a code on a selected item and transfers that code to the PID. For instance a bar-code reader that reads a bar code on a selected item and transfers that code to the PID is an item designator. A magnetic-stripe reader that reads a magnetic stripe on a selected item and transfers that code to the PID is another example of an item designator. A RF tag reader is yet another example of an item designator. As the customer meanders through the physical environment, he/she selects items for purchase by using the item designator to rapidly transfer the code for that item to the PID.

Figure 13:
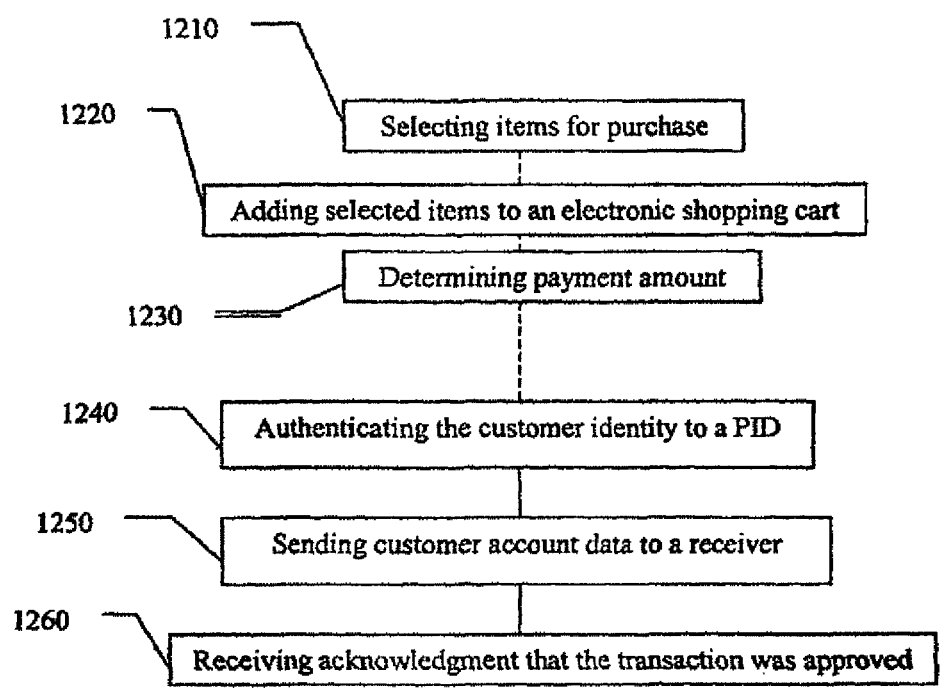
FIG. 13 illustrates a method for a customer to conduct a transaction.

FIG. 13 shows another set of embodiments of the invention. The embodiments in FIG. 13 involve methods for a customer to conduct a transaction. The methods include the steps of authenticating the customer identity to a PID 1240, sending customer account data to a receiver 1250, and receiving acknowledgment that the transaction was approved 1260. In this context the PID is a portable device that authenticates that a user of the device is privileged to use the device and is privileged to request that a payment be charged to a customer account at a customer financial intermediary. Preferably the PID authenticates the customer identity by determining that a biometric sample collected from the user of the personal identifying device sufficiently matches a biometric template associated with the customer account data. Most preferably the biometric sample is a digit-print.

The dashed lines connecting the steps on the top of FIG. 13 show steps that may be added to obtain additional embodiments of methods for a customer to conduct a transaction. These steps include the steps of selecting items for purchase 1210, adding the selected items for purchase to an electronic shopping cart 1220, and determining the payment amount for the selected items in the electronic shopping cart 1230. In some embodiments the electronic shopping cart is maintained on the PID, while in other embodiments, the electronic shopping cart is maintained elsewhere. Items may be selected through the use of a graphical user interface.

Figure 14:
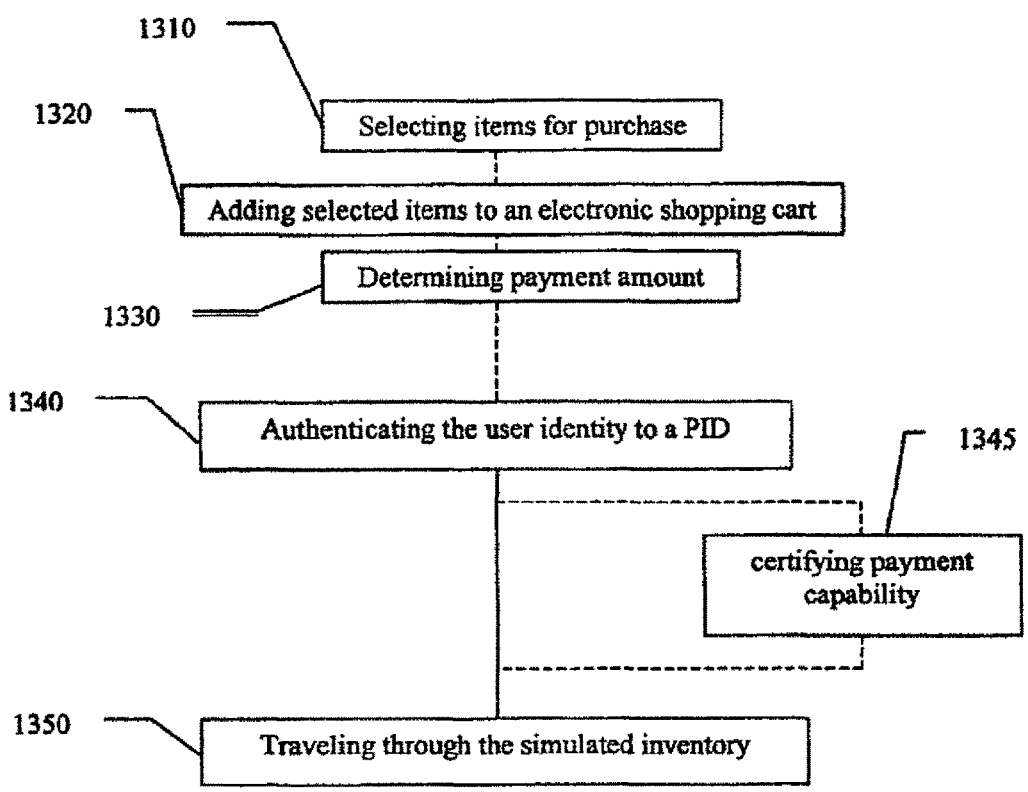
FIG. 14 illustrates a method for interacting with a simulated inventory.

FIG. 14 illustrates embodiments of the invention that include methods for interacting with a simulated inventory. As used here, a simulated inventory is visual representation of a catalog, index, directory, or other content. These methods use a PID to authenticate a user 1340. As used here, a PID is a portable device that authenticates that the user of the device is privileged to use the device. In addition, the PID used in these methods for interacting with a simulated inventory includes a user input module that receives inputs from the user. The inputs from the user to the PID are used to generate signals that allow the user to travel through the simulated inventory 1350. Travel is used here to mean the movement of a cursor in the simulated inventory. Icons in the graphical user interface represent items in the inventory. In various embodiments, the icons are color, shape, or texture coded to visually indicate cataloging or other details of the item represented by an icon. Although in some embodiments, accurate graphical renditions of the items represented by various icons are used, in other embodiments more meaningful information can be conveyed through symbolic renditions on the icons. In embodiments in which the simulated inventory is accessed over a network, the bandwidth required can be reduced by preloading icons and other resource-intensive objects onto the local computer. This can be performed either as an initial download, or preferably by providing these objects on a compact disk or other storage medium. With the resource-intensive objects residing locally, only codes that indicate which objects are to be used and in what arrangement need to be transferred over the network.

In some embodiments, an inventory gatekeeper restricts access to the simulated inventory. Only registered entities are allowed to enter. In these embodiments, the PIED communicates identity data to the inventory gatekeeper. The inventory gatekeeper checks a database to determine if the identity data is listed as a registered entity. If the identity data is listed as a registered entity, the inventory gatekeeper permits access. Otherwise, the inventory gatekeeper denies access. In some preferred embodiments, the inventory gatekeeper invites an unregistered entity that is denied access to become a registered entity by following a prescribed procedure. The procedure involves the disclosure of identity data that will be used to check for registration. The procedure also may involve the payment of a fee and the disclosure of other information.

Alternatively, some embodiments of simulated inventories are structured to retain users' anonymity. The inventory gatekeeper, if one exists, may only require sufficient information to confirm registration and then allow the user to chose a virtual cursor in such a way that the cursor cannot be traced to the user. This can be done by regularly purging the inventory gatekeeper of entry records or by any of numerous other methods known to those skilled in the art. Such anonymity may be desired for instance during window shopping or for making price comparisons, where the user does not wish to be contacted or pressured by others until he/she is ready to make his/her own decision with regard to if and what to purchase.

The database of identity data is not required to include only a single type of entity. For instance, the database may include data that identifies PIDs, individuals, and organizations. These correspond to registered entities that may be devices, people, or organizations. The individuals or organizations must have identity data that uniquely identifies them. In some embodiments the identity data comprise the PID control designation. Although not necessary, most preferably, the PID control designation is unique to each PID.

The simulated inventory has wide potential applications. For instance, in some embodiments it is used for inventory control in a factory or shop. In other embodiments the simulated inventory is که of a package delivery depot. Individual packages can easily be tracked in such a simulated inventory. Other applications include inventories of libraries, lost and founds, and sperm and egg banks. In addition to these applications, simulated inventories of shopping environments can transform the shopping experience.

In preferred embodiments, the simulated inventory is a shopping environment in which those entities that are allowed access are permitted to shop. For example, in various embodiments the simulated inventory is a grocery store, a department store, a parts warehouse, an automobile showroom, a boatyard, or a neighborhood with homes for sale. In yet other embodiments, other simulated sales environments, such as a shopping mall are used.

As shown in FIG. 14, the dashed lines connect optional steps that are most useful in simulated sales environments. For instance, the method of interacting with the simulated inventory preferably includes the step of selecting items for purchase from simulated inventory 1310. Preferably this is accomplished by overlaying a cursor on an icon in a graphical user interface and optionally triggering the selection by depressing an activation button on the PID. Multiple quantities of the selected item are preferably indicated by multiple depressions of an activation button on the PID. Other methods of indicating multiple quantities, such as through the use of keyboard entry or a pull-down menu are optionally provided. Indications of the selected quantity are optionally indicated on the PID, the icon, or both. The selected item is preferably highlighted when selected. In cases of three-dimensional graphical user interfaces or holographic graphical user interfaces, highlighting, or some other feedback means for indicating selection is particularly useful because of the possibility of misconstruing depth relationships between the cursor and the icon.

As shown in FIG. 14, in preferred embodiments in simulated sales environments, the method of interacting with the simulated inventory further includes the steps of adding selected items to an electronic shopping cart 1320, and determining a payment amount 1330. In preferred embodiments the step of selecting an item for purchase 1310 also adds the item to the user's electronic shopping cart 1320. However, in other embodiments the user must take additional action to add selected items to an electronic shopping cart.

Some preferred embodiments include a step of certifying payment capability 1345. Certifying an entity's payment capability before they are allowed entry into the simulated inventory reduces the cost of tracking entities that have no intention or capability of making a purchase. Various embodiments certify payment capability differently. In some environments it may not be necessary or appropriate to certify payment capability, i.e., either due to proven need for the product being sold (e.g., grocery stores, fast food), or the relative low cost of the inventory, or the need to not challenge customer prospects, etc. Thus, this step 1345 is optional. Of course, any vendor can organize their selling operation based on their notion how to best serve their customers.

In other preferred embodiments, payment capability is certified by establishing an account to which the cost of purchases is charged. In some embodiments the account owner is required to maintain a specified balance (either by maintaining a minimum positive cash balance or by not exceeding a maximum credit limit) in the account in order to continue making purchases from any vendor's simulated inventory. In some embodiments, this is done by provisionally debiting the account as items are selected for purchase. If a purchase would result in the account not maintaining the specified balance, the purchase would be prohibited. In preferred embodiments, the prohibition would be removed if additional funds were added to the account, the specified balance were modified, or previously selected items were returned in amounts sufficient to enable the new purchase without while still maintaining the specified account balance. Details of account management can vary widely. For instance, accounts can be standard credit-card accounts, standard bank accounts, or special-purpose accounts for use with one or more simulated inventory offerings from one or more vendors.

In other embodiments, payment capability is established through a credit check, or some form of credit instrument, bond, or other debt or credit instrument from a financial intermediary. These forms of certifying payment capability would be appropriate for simulated inventories of high-priced items. In particular, houses, automobiles, boats and airplanes could be viewed with such a simulated inventory. Although the prospective purchaser of such high-priced items would probably wish to view the actual item before finalizing the purchase, numerous candidate items could be screened through the simulated inventory before choosing which ones deserve a physical visit.

To reduce the possibility of fraud, in preferred embodiments, the PID repeatedly authenticates the user. The details of the repeated authentications vary with particular embodiments. For instance, the repeated authentications can be either at regular or at irregular intervals of some metric. The metric can be either time or some other measure.

Unlike many computer and on-line shopping models currently in use, various embodiments of the simulated inventory are more nearly like shopping in a shopping mall having multiple stores, rather than a single store. In some embodiments storeowners would essentially rent space from the provider of the simulated inventory. For the shopper, various embodiments permit the use of a single electronic shopping cart for all purchases. In preferred embodiments the electronic shopping cart tracks from which store each item was selected. Preferably a single checkout procedure properly credits each of the merchants for items selected from their store and separately obligates each of the merchants for providing the selected goods or services. Such an approach frees the consumer from going through multiple checkouts and allows the consumer to easily return items selected from one merchant if a better or less costly, or otherwise preferred item is found in another merchant's store in the simulated shopping environment.

As is clear from the above descriptions, invention described herein entails many possible embodiments.

The above description and drawings are only illustrative of preferred embodiments that achieve the objects, features, and advantages of the present invention, and it is not intended that the present invention be limited thereto. Any modification of the present invention that comes within the spirit and scope of the following claims is considered part of the present invention.

In the following claims, the use of the articles "a" and "an" should be interpreted to mean "at least one" of the designated element unless the claim specifically limits the number of the designated element. The use of the phrase "at least one" in any claim is intended to emphasize the possible plurality of the specified element, but its use does not limit the possible plurality of other elements specified with "a" or "an."

simulated inventory reduces the cost of tracking entities that have no intention or capability of making a purchase. Various embodiments certify payment capability differently. In some environments it may not be necessary or appropriate to certify payment capability, i.e., either due to proven need for the product being sold (e.g., grocery stores, fast food), or the relative low cost of the inventory, or the need to not challenge customer prospects, etc. Thus, this step 1345 is optional. Of course, any vendor can organize their selling operation based on their notion how to best serve their customers.

In other preferred embodiments, payment capability is certified by establishing an account to which the cost of purchases is charged. In some embodiments the account owner is required to maintain a specified balance (either by maintaining a minimum positive cash balance or by not exceeding a maximum credit limit) in the account in order to continue making purchases from any vendor's simulated inventory. In some embodiments, this is done by provisionally debiting the account as items are selected for purchase. If a purchase would result in the account not maintaining the specified balance, the purchase would be prohibited. In preferred embodiments, the prohibition would be removed if additional funds were added to the account, the specified balance were modified, or previously selected items were returned in amounts sufficient to enable the new purchase without while still maintaining the specified account balance. Details of account management can vary widely. For instance, accounts can be standard credit-card accounts, standard bank accounts, or special-purpose accounts for use with one or more simulated inventory offerings from one or more vendors.

In other embodiments, payment capability is established through a credit check, or some form of credit instrument, bond, or other debt or credit instrument from a financial intermediary. These forms of certifying payment capability would be appropriate for simulated inventories of high-priced items. In particular, houses, automobiles, boats and airplanes could be viewed with such a simulated inventory. Although the prospective purchaser of such high-priced items would probably wish to view the actual item before finalizing the purchase, numerous candidate items could be screened through the simulated inventory before choosing which ones deserve a physical visit.

To reduce the possibility of fraud, in preferred embodiments, the PID repeatedly authenticates the user. The details of the repeated authentications vary with particular embodiments. For instance, the repeated authentications can be either at regular or at irregular intervals of some metric. The metric can be either time or some other measure.

Unlike many computer and on-line shopping models currently in use, various embodiments of the simulated inventory are more nearly like shopping in a shopping mall having multiple stores, rather than a single store. In some embodiments storeowners would essentially rent space from the provider of the simulated inventory. For the shopper, various embodiments permit the use of a single electronic shopping cart for all purchases. In preferred embodiments the electronic shopping cart tracks from which store each item was selected. Preferably a single checkout procedure properly credits each of the merchants for items selected from their store and separately obligates each of the merchants for providing the selected goods or services. Such an approach frees the consumer from going through multiple checkouts and allows the consumer to easily return items selected from one merchant if a better or less costly, or otherwise preferred item is found in another merchant's store in the simulated shopping environment.

As is clear from the above descriptions, invention described herein entails many possible embodiments.

The above description and drawings are only illustrative of preferred embodiments that achieve the objects, features, and advantages of the present invention, and it is not intended that the present invention be limited thereto. Any modification of the present invention that comes within the spirit and scope of the following claims is considered part of the present invention.

In the following claims, the use of the articles "a" and "an" should be interpreted to mean "at least one" of the designated element unless the claim specifically limits the number of the designated element. The use of the phrase "at least one" in any claim is intended to emphasize the possible plurality of the specified element, but its use does not limit the possible plurality of other elements specified with "a" or "an."

What is claimed is:

1. An apparatus, comprising:
    a portable housing;
    a biometric sensor carried by the portable housing to collect biometric samples from a user;
    a memory carried by the portable housing and storing a biometric template; and
    a processor carried by the portable housing and coupled to the biometric sensor and the memory, the processor
        comparing the biometric samples to the biometric template to authenticate the user, and
        updating the biometric template over time based upon the collected biometric samples and after a specified changing number of user authentications between each biometric template update.

2. The apparatus of claim 1 wherein the processor updates the biometric template at periodic intervals.

3. The apparatus of claim 1 further comprising a user input device carried by the portable housing; and wherein said processor updates the biometric template responsive to the user input device.

4. The apparatus of claim 1 wherein said processor initially stores the biometric template in the memory based upon the biometric sensor and responsive to a verification authority.

5. The apparatus of claim 1 further comprising a battery carried by the portable housing and coupled to the processor and the biometric sensor.

6. An authentication method for an apparatus comprising a portable housing, a biometric sensor carried by the portable housing to collect biometric samples from a user, and a memory carried by the portable housing, the method comprising:
    storing a biometric template in the memory;
    comparing the biometric samples to the biometric template to authenticate the user; and
    updating the biometric template over time based upon the collected biometric samples and after a specified changing number of user authentications between each biometric template update.

7. The method of claim 6 wherein updating comprises updating the biometric template at periodic intervals.

8. The method of claim 6 wherein the apparatus further comprises a user input device carried by the portable housing; and wherein updating comprises updating the biometric template responsive to the user input device.

9. The method of claim 6 wherein storing the biometric template in the memory comprises storing the biometric template in the memory based upon the biometric sensor and responsive to a verification authority.

10. A non-transitory computer-readable medium for an apparatus comprising a portable housing, a biometric sensor carried by the portable housing to collect biometric samples from a user, and a memory carried by the portable housing, the non-transitory computer-readable medium having computer-executable instructions for causing the apparatus to perform steps comprising:
    storing a biometric template in the memory;
    comparing the biometric samples to the biometric template to authenticate the user; and
    updating the biometric template over time based upon the collected biometric samples and after a specified changing number of user authentications between each biometric template update.

11. The non-transitory computer-readable medium of claim 10 wherein updating comprises updating the biometric template at periodic intervals.

12. The non-transitory computer-readable medium of claim 10 wherein the apparatus further comprises a user input device carried by the portable housing; and wherein updating comprises updating the biometric template responsive to the user input device.

13. The non-transitory computer-readable medium of claim 10 wherein storing the biometric template in the memory comprises storing the biometric template in the memory based upon the biometric sensor and responsive to a verification authority.

* * * * *